United States Patent
Chen et al.

(10) Patent No.: US 11,040,593 B1
(45) Date of Patent: *Jun. 22, 2021

(54) OCCUPANT SAFETY SYSTEMS TO RESPOND TO CURRENT CONDITIONS AND PREVENT INJURIES OF ANIMATE OBJECTS

(71) Applicants: Changhai Chen, Bloomfield Hills, MI (US); Michael Chen, Bloomfield Hills, MI (US); Daniel Chen, Bloomfield Hills, MI (US)

(72) Inventors: Changhai Chen, Bloomfield Hills, MI (US); Michael Chen, Bloomfield Hills, MI (US); Daniel Chen, Bloomfield Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/662,546

(22) Filed: Oct. 24, 2019

Related U.S. Application Data

(63) Continuation-in-part of application No. 16/214,200, filed on Dec. 10, 2018, now Pat. No. 10,629,043,
(Continued)

(51) Int. Cl.
*G08B 21/00* (2006.01)
*B60H 1/00* (2006.01)
(Continued)

(52) U.S. Cl.
CPC ..... *B60H 1/00742* (2013.01); *B60H 1/00792* (2013.01); *B60H 1/00821* (2013.01);
(Continued)

(58) Field of Classification Search
CPC  G08B 21/02; B60H 1/00742; B60H 1/00978; B60H 1/00792; B60H 1/00878;
(Continued)

(56) References Cited

U.S. PATENT DOCUMENTS

| | | | |
|---|---|---|---|
| 2004/0074244 A1* | 4/2004 | Ichishi | G06K 9/00845 62/186 |
| 2014/0169404 A1* | 6/2014 | Lam | B60N 2/002 374/179 |

(Continued)

*Primary Examiner* — Mark S Rushing
(74) *Attorney, Agent, or Firm* — Harness, Dickey & Pierce, P.L.C.

(57) ABSTRACT

A vehicle occupant safety system includes temperature, ambient, and interior monitoring modules. The temperature monitoring module includes at least one temperature sensor. The temperature monitoring module is configured to detect temperatures in zones within an interior of a vehicle. The ambient temperature sensor is configured to detect an ambient temperature within the interior of the vehicle. The interior monitoring module is configured to: based on the detected temperatures of the zones, determine for the zones at least one of a temperature gradient over time or a temperature gradient over space; determine if the ambient temperature is outside a predetermined range; and in response to the ambient temperature being outside the predetermined range and based on the at least one of a temperature gradient over time or a temperature gradient over space, detecting an occupant in the vehicle and performing a countermeasure to prevent an injury to the occupant.

26 Claims, 11 Drawing Sheets

Related U.S. Application Data which is a continuation of application No. 16/172,827, filed on Oct. 28, 2018, now abandoned.

(60) Provisional application No. 62/893,083, filed on Aug. 28, 2019.

(51) Int. Cl.
*E05F 15/71* (2015.01)
*B60R 11/04* (2006.01)
*B60R 11/00* (2006.01)

(52) U.S. Cl.
CPC ......... *B60H 1/00878* (2013.01); *E05F 15/71* (2015.01); *B60R 11/04* (2013.01); *B60R 2011/0003* (2013.01); *E05Y 2400/32* (2013.01); *E05Y 2400/44* (2013.01); *E05Y 2400/52* (2013.01); *E05Y 2900/531* (2013.01); *E05Y 2900/542* (2013.01); *E05Y 2900/55* (2013.01)

(58) Field of Classification Search
CPC ...... B60H 1/00821; B60W 10/30; G01J 5/10; G01K 7/02; E05F 15/71; B60R 11/04; B60R 2011/0003; E05Y 2900/55; E05Y 2900/542; E05Y 2400/32; E05Y 2400/44; E05Y 2400/52; E05Y 2900/531
USPC ....................................................... 340/573.1
See application file for complete search history.

(56) References Cited

U.S. PATENT DOCUMENTS

| | | | |
|---|---|---|---|
| 2015/0025738 A1* | 1/2015 | Tumas | B60H 1/00742 701/36 |
| 2015/0313475 A1* | 11/2015 | Benson | A61B 5/0245 297/217.3 |
| 2017/0088098 A1* | 3/2017 | Frank | G06K 9/00362 |
| 2017/0158186 A1* | 6/2017 | Soifer | B60H 1/00742 |

\* cited by examiner

OCCUPANT SAFETY SYSTEMS TO RESPOND TO CURRENT CONDITIONS AND PREVENT INJURIES OF ANIMATE OBJECTS

CROSS-REFERENCE TO RELATED APPLICATIONS

The present disclosure is a continuation-in-part of U.S. patent application Ser. No. 16/214,200 filed on Dec. 10, 2018. U.S. patent application Ser. No. 16/214,200 is a continuation application of U.S. patent application Ser. No. 16/172,827 filed on Oct. 28, 2018. U.S. patent application Ser. No. 16/172,827 claims the benefit of U.S. Provisional Application No. 62/578,454 filed on Oct. 29, 2017. The present application claims the benefit of U.S. Provisional Application No. 62/893,083, filed on Aug. 28, 2019. The entire disclosures of the applications referenced above are incorporated herein by reference.

FIELD

The present disclosure relates to vehicle occupant safety systems, security systems, and medical alert systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Tens of children die in parked vehicles each year due to heatstroke. Temperatures within a vehicle can increase quickly (e.g. 43° F. in an hour) when parked, for example, in the sun on a hot day. The temperatures can exceed 140° F. Children are sometimes left in vehicles for extended periods of time. This often occurs when a parent needs to run a quick errand and the errand ends up taking longer than expected. Approximately 54% of the children that die in vehicles are accidently forgotten by caregivers and approximately 45% either (i) gained access to the interior of the corresponding vehicle and remained in the vehicle for various reasons or (ii) were intentionally left in the vehicles. Other people (e.g., elderly people and people with disabilities) and pets are also susceptible to experiencing a heatstroke in a vehicle. Issues can also arise when, for example, an occupant is left in a vehicle for an extended period of time when outside temperatures are near or below freezing temperatures (e.g., less than 40° F.), such as during winter.

In addition, there are numerous injuries and/or deaths that occur within residential and non-residential settings when an individual is alone. The individual experiences an issue (e.g., a heart attack, a stroke, etc.) and/or has an accident and is unable to contact anyone for assistance. The individual may remain stuck in a certain location and not be discovered for extended periods of time. When an issue and/or accident occurs, time is of the essence. The quicker aid is provided, the less chance of the injury becoming worse and/or other issues arising. The quicker aid is provided the better chance of full recovering and the less chance of death.

Traditional residential security systems, when activated, typically monitor doors and windows of a home and detect when an intruder enters the residence through the doors and/or windows. Some of these systems include motion detectors and detect movement within the home. These types of security systems can generate false alarms. These systems can, for example, generate a false alarm when, the security systems are in an activated state and movement of a non-intruder is detected, such as movement of a resident, a guest, and/or a pet.

SUMMARY

A vehicle occupant safety system is provided and includes a temperature monitoring module, an ambient monitoring module, and an interior monitoring module. The temperature monitoring module includes at least one temperature sensor. The temperature monitoring module is configured to detect temperatures in zones within an interior of a vehicle. The ambient temperature sensor is configured to detect an ambient temperature within the interior of the vehicle. The interior monitoring module is configured to: based on the detected temperatures of the zones, determine for the zones at least one of a temperature gradient over time or a temperature gradient over space; determine if the ambient temperature is outside a predetermined range; and in response to the ambient temperature being outside the predetermined range and based on the at least one of a temperature gradient over time or a temperature gradient over space, detecting an occupant in the vehicle and performing a countermeasure to prevent an injury to the occupant.

In other features, the interior monitoring module is configured to: determine whether at least one of a propulsion system, an engine, or a motor is deactivated; and perform the countermeasure in response to the at least one of the propulsion system, the engine, or the motor being deactivated.

In other features, the interior monitoring module is configured to: determine at least one of whether an occupant is in a driver seat of the vehicle or a driver door of the vehicle is transitioned from a closed state to an open state or from an open state to a closed state; and perform the countermeasure in response to at least one of no occupant being in the driver seat or the driver door being opened or closed.

In other features, the interior monitoring module is configured to: based on the detected temperatures, determine for each of at least some of the zones a temperature gradient over time; and in response to the ambient temperature being outside the predetermined range and based on the temperature gradients over time of the at least some of the zones, detecting the occupant in the vehicle and performing the countermeasure to prevent an injury to the occupant.

In other features, the interior monitoring module is configured to: based on the detected temperatures of the zones, determine for at least some of the zones the temperature gradient over space; and in response to the ambient temperature being outside the predetermined range and based on the temperature gradient over space, detecting the occupant in the vehicle and performing the countermeasure to prevent an injury to the occupant.

In other features, the interior monitoring module is configured to: based on the detected temperatures of the zones, determine for the zones the temperature gradient over time and the temperature gradient over space; and in response to the ambient temperature being outside the predetermined range and based on the temperature gradient over time and the temperature gradient over space, detecting the occupant in the vehicle and performing the countermeasure to prevent an injury to the occupant.

In other features, the interior monitoring module is configured to: based on the detected temperatures of the zones, determine for the zones at least one of a gradient of the temperature gradient over time or a gradient of the temperature gradient over space; and in response to the ambient temperature being outside the predetermined range and based on the at least one of the gradient of the temperature gradient over time or the gradient of the temperature gradient over space, detecting the occupant in the vehicle and performing the countermeasure to prevent an injury to the occupant.

In other features, the countermeasure includes: at least one of capturing an image or recording a video of at least a portion of the interior of the vehicle; and transmitting at least one of the image or the video to a personal related network device or a central monitoring device.

In other features, the countermeasure includes at least one of taking a measurement, doing a calculation, opening a window, opening a door, opening a roof panel, or controlling operation of a heating, ventilation, and air conditioning system.

In other features, the interior monitoring module is configured to: in response to the ambient temperature being outside the predetermined range and based on the at least one of the temperature gradient over time or the temperature gradient over space, transmit a signal to at least one of a personal related network device or a central monitoring device; based on the signal transmitted to the at least one of the personal related network device or the central monitoring device, receive a response signal; and based on the response signal, perform the countermeasure.

In other features, the signal is transmitted to the at least one of the personal related network device or the central monitoring device includes condition information describing a state of the interior of the vehicle including a state of the occupant in the interior.

In other features, the at least one temperature sensor comprises a thermopile array sensor. The thermopile array sensor is configured to divide the interior of the vehicle into the plurality of zones and measure the temperatures in the plurality of zones.

In other features, the vehicle occupant safety system further includes an actuator, wherein interior monitoring module is configured to move the at least one temperature sensor to scan the interior of the vehicle to measure temperatures in the plurality of zones.

In other features, a method of operating a vehicle occupant safety system is provided. The method includes: detecting temperatures in zones within an interior of a vehicle; detecting an ambient temperature within the interior of the vehicle; based on the detected temperatures of the zones, determining for the zones at least one of a temperature gradient over time or a temperature gradient over space; determining if the ambient temperature is outside a predetermined range; and in response to the ambient temperature being outside the predetermined range and based on the at least one of a temperature gradient over time or a temperature gradient over space, detecting an occupant in the vehicle and performing a countermeasure to prevent an injury to the occupant.

In other features, the method further includes: determining whether at least one of a propulsion system, an engine, or a motor is deactivated; and performing the countermeasure in response to the at least one of the propulsion system, the engine, or the motor being deactivated.

In other features, the method further includes: determining at least one of whether an occupant is in a driver seat of the vehicle or a driver door of the vehicle is transitioned from a closed state to an open state or from an open state to a closed state; and performing the countermeasure in response to at least one of no occupant being in the driver seat or the driver door being opened or closed.

In other features, the method further includes: based on the detected temperatures of the zones, determining for each of at least some of the zones a temperature gradient over time; and in response to the ambient temperature being outside the predetermined range and based on the temperature gradients over time of the at least some of the zones, detecting the occupant in the vehicle and performing the countermeasure to prevent an injury to the occupant.

In other features, the method further includes: based on the detected temperatures of the zones, determining for at least some of the zones the temperature gradient over space; and in response to the ambient temperature being outside the predetermined range and based on the temperature gradient over space, detecting the occupant in the vehicle and performing the countermeasure to prevent an injury to the occupant.

In other features, the method further includes: based on the detected temperatures of the zones, determining for the zones the temperature gradient over time and the temperature gradient over space; and in response to the ambient temperature being outside the predetermined range and based on the temperature gradient over time and the temperature gradient over space, detecting the occupant in the vehicle and performing the countermeasure to prevent an injury to the occupant.

In other features, the method further includes: based on the detected temperatures of the zones, determining for the zones at least one of a gradient of the temperature gradient over time or a gradient of the temperature gradient over space; and in response to the ambient temperature being outside the predetermined range and based on the at least one of the gradient of the temperature gradient over time or the gradient of the temperature gradient over space, detecting the occupant in the vehicle and performing the countermeasure to prevent an injury to the occupant.

In other features, the countermeasure includes: at least one of capturing an image or recording a video of at least a portion of the interior of the vehicle; and transmitting at least one of the image or the video to a personal related network device or a central monitoring device.

In other features, the countermeasure includes at least one of taking a measurement, doing a calculation, opening a window, opening a door, opening a roof panel, or controlling operation of a heating, ventilation, and air conditioning system.

In other features, the method further includes: in response to the ambient temperature being outside the predetermined range and based on the at least one of the temperature gradient over time or the temperature gradient over space, transmitting a signal to at least one of a personal related network device or a central monitoring device; based on the signal transmitted to the at least one of the personal related network device or the central monitoring device, receiving a response signal; and based on the response signal, performing the countermeasure.

In other features, the signal is transmitted to the at least one of the personal related network device or the central monitoring device includes condition information describing a state of the interior of the vehicle including a state of the occupant in the interior.

In other features, the temperatures of the zones are detected via a thermopile array sensor. The thermopile array sensor is configured to divide the interior of the vehicle into the zones and measure the temperatures in the zones. In other features, the method further includes moving at least one temperature sensor to scan the interior of the vehicle to measure temperatures in the plurality of zones.

An occupant safety system includes a temperature monitoring module and interior monitoring module. The temperature monitoring module including at least one temperature sensor. The temperature monitoring module is configured to detect temperatures in zones within an interior space of a building. The interior monitoring module is configured to: based on the detected temperatures, determine for the zones at least one of a temperature gradient over time or a temperature gradient over space; access historical data; based on the historical data, analyze the at least one of the temperature gradient over time or the temperature gradient over space to determine if the at least one of the temperature gradient over time or the temperature gradient over space satisfy predetermined criteria; and based on results of analyzing the at least one of a temperature gradient over time or a temperature gradient over space, detecting a potential issue with an occupant in the interior space of the building and performing a countermeasure to prevent an injury to the occupant.

In other features, the interior monitoring module is configured to: based on the detected temperatures, determine for each of at least some of the zones a temperature gradient over time; and based on the temperature gradients over time of the at least some of the zones, detecting the potential issue with the occupant and performing the countermeasure to prevent an injury to the occupant.

In other features, the interior monitoring module is configured to: based on the detected temperatures, determine for at least some of the zones the temperature gradient over space; and based on the temperature gradient over space, detecting the potential issue with the occupant and performing the countermeasure to prevent an injury to the occupant.

In other features, the interior monitoring module is configured to: based on the detected temperatures, determine for the zones the temperature gradient over time and the temperature gradient over space; and based on the temperature gradient over time and the temperature gradient over space, detecting the potential issue with the occupant and performing the countermeasure to prevent an injury to the occupant.

In other features, the interior monitoring module is configured to: based on the detected temperatures, determine for the zones at least one of a gradient of the temperature gradient over time or a gradient of the temperature gradient over space; and based on the at least one of the gradient of the temperature gradient over time or the gradient of the temperature gradient over space, detecting the potential issue with the occupant and performing the countermeasure to prevent an injury to the occupant.

In other features, the countermeasure includes: at least one of capturing an image or recording a video of at least a portion of the interior space; and transmitting at least one of the image or the video to a personal related network device or a central monitoring device.

In other features, the countermeasure includes at least one of taking a measurement, doing a calculation, opening a window, opening a door, or controlling operation of a heating, ventilation, and air conditioning system.

In other features, the interior monitoring module is configured to: based on the at least one of the temperature gradient over time or the temperature gradient over space, transmit a signal to at least one of a personal related network device or a central monitoring device; based on the signal transmitted to the at least one of the personal related network device or the central monitoring device, receive a response signal; and based on the response signal, perform the countermeasure.

In other features, the signal transmitted to the at least one of the personal related network device or the central monitoring device includes condition information describing a state of the interior space including a state of the occupant in the interior space.

In other features, the at least one temperature sensor comprises a thermopile array sensor; and the thermopile array sensor is configured to divide the interior space into the zones and measure the temperatures in the zones.

In other features, the occupant safety system further includes an actuator, where interior monitoring module is configured to move the at least one temperature sensor to scan the interior space to measure temperatures in the zones.

In other features, an occupant safety system is provided and includes a temperature monitoring module and an interior monitoring module. The temperature monitoring module includes at least one temperature sensor. The temperature monitoring module is configured to detect temperatures in zones within an interior space of a building. The interior monitoring module is configured to: based on the detected temperatures, determine for the zones at least one of a temperature gradient over time or a temperature gradient over space; access historical data; based on the historical data, analyze the at least one of the temperature gradient over time or the temperature gradient over space to determine if the at least one of the temperature gradient over time or the temperature gradient over space satisfy predetermined criteria; and based on results of analyzing the at least one of a temperature gradient over time or a temperature gradient over space, detecting a potential intruder in the interior space of the building and performing a countermeasure.

In other features, the interior monitoring module is configured to: determine at least one of whether a door or a window of has been broken and/or opened for the interior space of the building; and perform the countermeasure in response to at least one of the door or the window being opened.

In other features, the interior monitoring module is configured to: based on the detected temperatures, determine for each of at least some of the zones a temperature gradient over time; and based on the temperature gradients over time of the at least some of the zones, detecting the intruder and performing the countermeasure.

In other features, the interior monitoring module is configured to: based on the detected temperatures, determine for at least some of the zones the temperature gradient over space; and based on the temperature gradient over space, detecting the intruder and performing the countermeasure.

In other features, the interior monitoring module is configured to: based on the detected temperatures, determine for the zones the temperature gradient over time and the temperature gradient over space; and based on the temperature gradient over time and the temperature gradient over space, detecting the intruder and performing the countermeasure.

In other features, the interior monitoring module is configured to: based on the detected temperatures, determine for the zones at least one of a gradient of the temperature gradient over time or a gradient of the temperature gradient over space; and based on the at least one of the gradient of the temperature gradient over time or the gradient of the temperature gradient over space, detecting the intruder and performing the countermeasure.

In other features, the countermeasure includes: at least one of capturing an image or recording a video of at least a portion of the interior space; and transmitting at least one of the image or the video to a personal related network device or a central monitoring device.

In other features, the countermeasure includes at least one of taking a measurement, doing a calculation, locking or closing a window, locking or closing a door, or generating an alarm.

In other features, the interior monitoring module is configured to: based on the at least one of the temperature gradient over time or the temperature gradient over space, transmit a signal to at least one of a personal related network device or a central monitoring device; based on the signal transmitted to the at least one of the personal related network device or the central monitoring device, receive a response signal; and based on the response signal, perform the countermeasure.

In other features, the signal transmitted to the at least one of the personal related network device or the central monitoring device includes condition information describing a state of the interior space including the occupants in the interior space.

In other features, the at least one temperature sensor comprises a thermopile array sensor. The thermopile array sensor is configured to divide the interior space into the zones and measure the temperatures in the zones.

In other features, the occupant safety system further includes an actuator, where interior monitoring module is configured to move the at least one temperature sensor to scan the interior space to measure temperatures in the zones.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
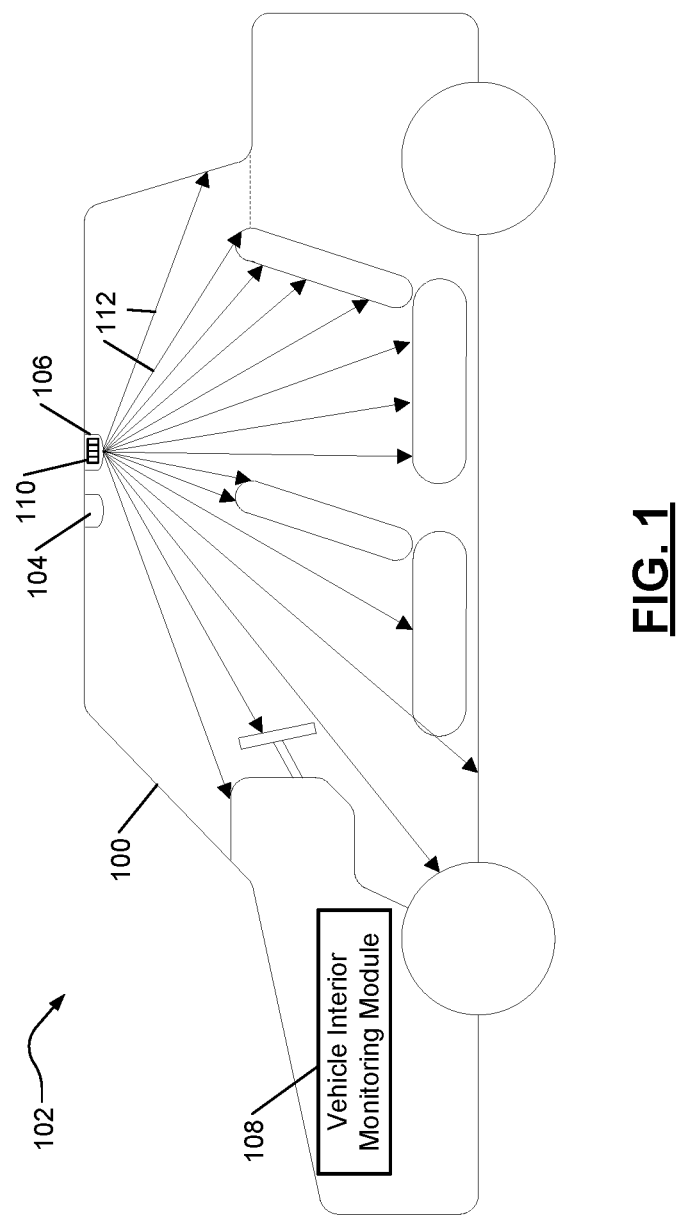
FIG. 1 is a side cross-sectional view of an example of a vehicle including a vehicle occupant safety system with a vehicle interior monitoring module in accordance with an embodiment of the present disclosure.

A vehicle occupant safety system may detect (i) when a seat belt is buckled, (ii) when a person is sitting in a seat based on, for example, detected pressure on a seat, and/or (iii) detect a temperature within an interior vehicle cabin. These types of systems have associated limitations and inaccuracies. The stated systems can falsely indicate that a child has been left in a vehicle, when in fact no child is in the vehicle. For example, a system that detects presence of a child based on whether a seat belt is buckled can generate a false alarm if the child moved out from under the seat belt and/or sits on the buckled seat belt and then leaves and/or is removed from the vehicle without unbuckling the seat belt. An alarm or an alert signal may be generated indicating the child is in the seat when the child is actually no longer in the vehicle.

A system that detects weight and/or pressure on a seat can also provide a false alarm when there is an inanimate object disposed on the seat and the system interprets this as presence of a child or pet. A false alarm can also be generated by a system that monitors, for example, (i) a temperature in a vehicle cabin, and (ii) whether a seat belt is buckled and/or whether weight or pressure on a seat has exceeded a threshold. The system may indicate an occupant is in the vehicle and cabin temperature is greater than a predetermined temperature, when no occupant is actually in the vehicle. Cabin temperature is not indicative of whether a person is in the vehicle.

The examples set forth herein provide vehicle interior safety systems that reliably and accurately detect whether an animate object (e.g., a person or a pet) has been left in a vehicle and conditions within the vehicle are such that immediate attention may be needed. The vehicle interior safety systems monitor condition changes over time and space and corresponding relationships to detect whether an animate object is present and/or moving within an interior space of a vehicle. The vehicle interior safety systems provide warning signals to, for example, vehicle owners and/or users providing images of corresponding vehicle interiors and indicate interior conditions, such that the vehicle owners and/or users are able to then determine whether to take immediate actions. For example, the vehicle owners and/or users may view the interior images and notice that a person or pet has been left in a vehicle and go to the vehicle to remove the person or pet from the vehicle, open the windows and/or doors of the vehicle, and/or activate an air-conditioning system to adjust a temperature of the interior of the vehicle.

In addition to detecting an animate object in an interior space of a vehicle, there are also other situations in which presence and movement of animate objects may be detected, monitored, reported and acted upon. Example systems are also set forth herein that reliably and accurately detect whether a person, within an interior space of, for example, a building (e.g., a residential home), is having an issue and/or is injured and needs medical attention. An example of this is when, for example, an elderly person is living alone, falls, is injured and is unable to move and contact someone for help. Example systems are also set forth herein that reliably and accurately detect an intruder within an interior space of a building.

The examples set forth herein include devices, modules, and systems for detecting an occupant in an interior space, such as within a vehicle, a room of a building (e.g., residential home or commercial building), etc. The devices, modules and systems monitor occupant movement and behavior, as well as interior conditions and perform countermeasures based on collected and historical information. The present disclosure includes systems, methods and sets of devices which collectively detect animate objects in a space, monitor movements of the animate objects and perform countermeasures including generating alert signals and notifications, which may be sent to various network devices of various people and entities.

Further areas of applicability will become apparent from the description provided herein. It should be understood that the description and specific examples are intended for purposes of illustration only and are not intended to limit the scope of present disclosure.

The following description is merely exemplary in nature and is not intended to limit the present disclosure, application, or uses. It should be understood that throughout the drawings, corresponding reference numerals indicate corresponding parts and features. The terms "occupant" and "animate object" may refer to a person or a pet. The term "vehicle" may refer to any form of transportation including automobiles, trucks, sport utility vehicles, buses, vans, etc.

FIG. 1 shows a vehicle 100 including a vehicle occupant safety system 102 (a portion of which is shown in FIG. 1). The vehicle occupant safety system 102 may include a camera system with lighting source 104, one or more temperature monitoring modules (one temperature monitoring module 106 is shown) and a vehicle interior monitoring module 108. Each of the temperature monitoring modules may include one or more temperature sensors. In the example shown, the temperature monitoring module 106 includes multiple temperature sensors and/or distinct temperature sensing elements 110. The temperature monitoring module 106 measures temperatures at multiple points and/or zones (illustrated by arrows 112) inside the vehicle 100. The vehicle interior monitoring module 108 based on signals from the temperature monitoring module 106 detects temperature(s), presence, location, and movement of occupants in the vehicle 100. The vehicle occupant safety system 102 is further described below.

Figure 2:
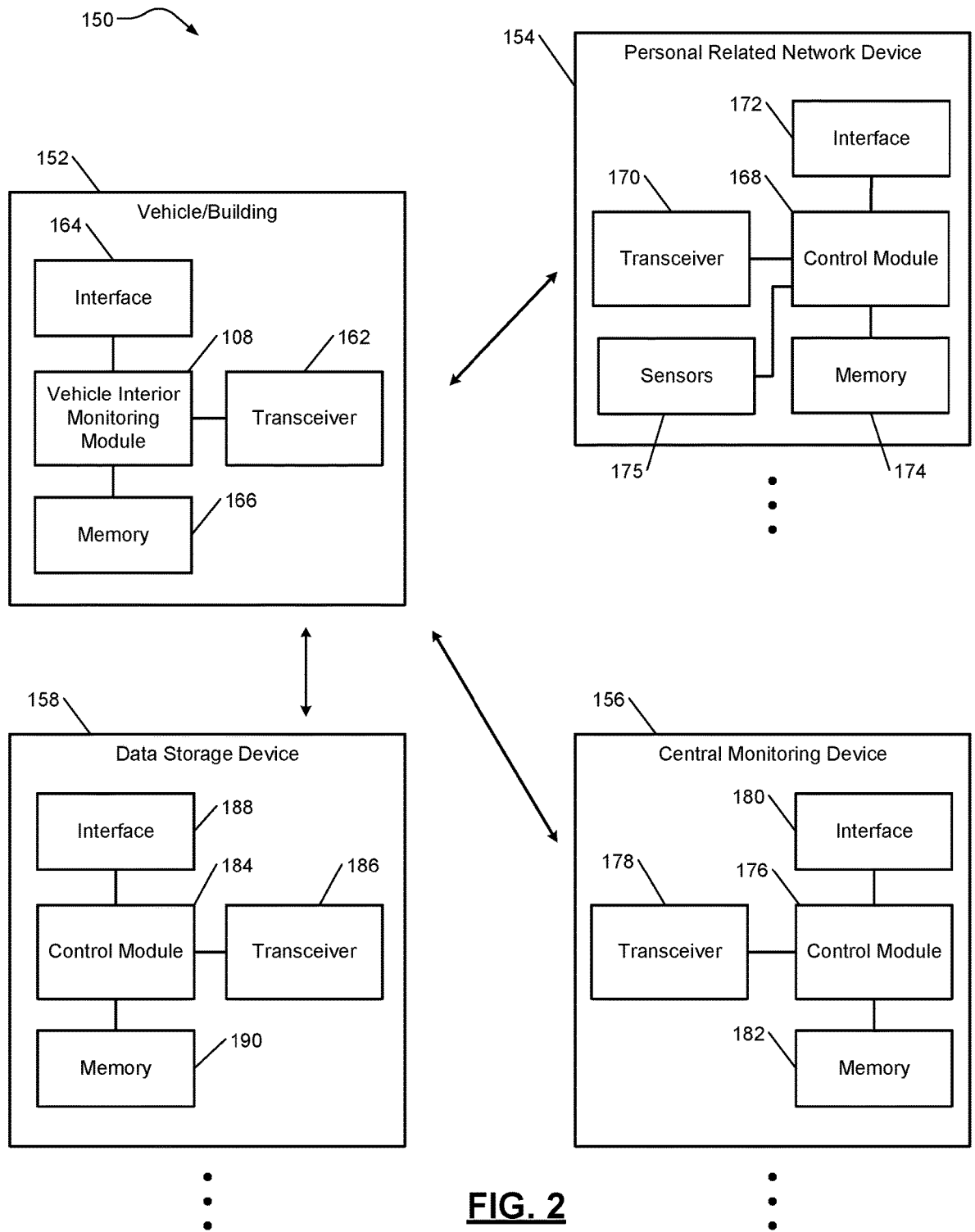
FIG. 2 is a block diagrammatic view of an example of an occupant monitoring and responding system in accordance with an embodiment of the present disclosure.

FIG. 2 shows a vehicle occupant monitoring and responding system 150 that may include a vehicle or building (vehicle/building) 152, one or more personal related network devices 154, one or more central monitoring devices 156, and one or more data storage devices 158; one of each are shown in FIG. 2. The vehicle/building 152 includes an interior monitoring module (e.g., the vehicle interior monitoring module 108 or other interior monitoring module disclosed herein), a transceiver 162, an interface 164 and a memory 166. The personal related network devices 154 may include a control module 168, a transceiver 170, an interface 172, a memory 174, and sensors 175. The central monitoring device 156 may include a control module 176, a transceiver 178, an interface 180 and/or a memory 182. The data storage device 158 may include a control module 184, a transceiver 186, an interface 188 and a memory 190. The sensors 175 may include, for example, vital sign sensors. One or more of the personal related network devices 154 and/or one or more of the sensors 175 may be implemented as a wearable devices.

Figure 6:
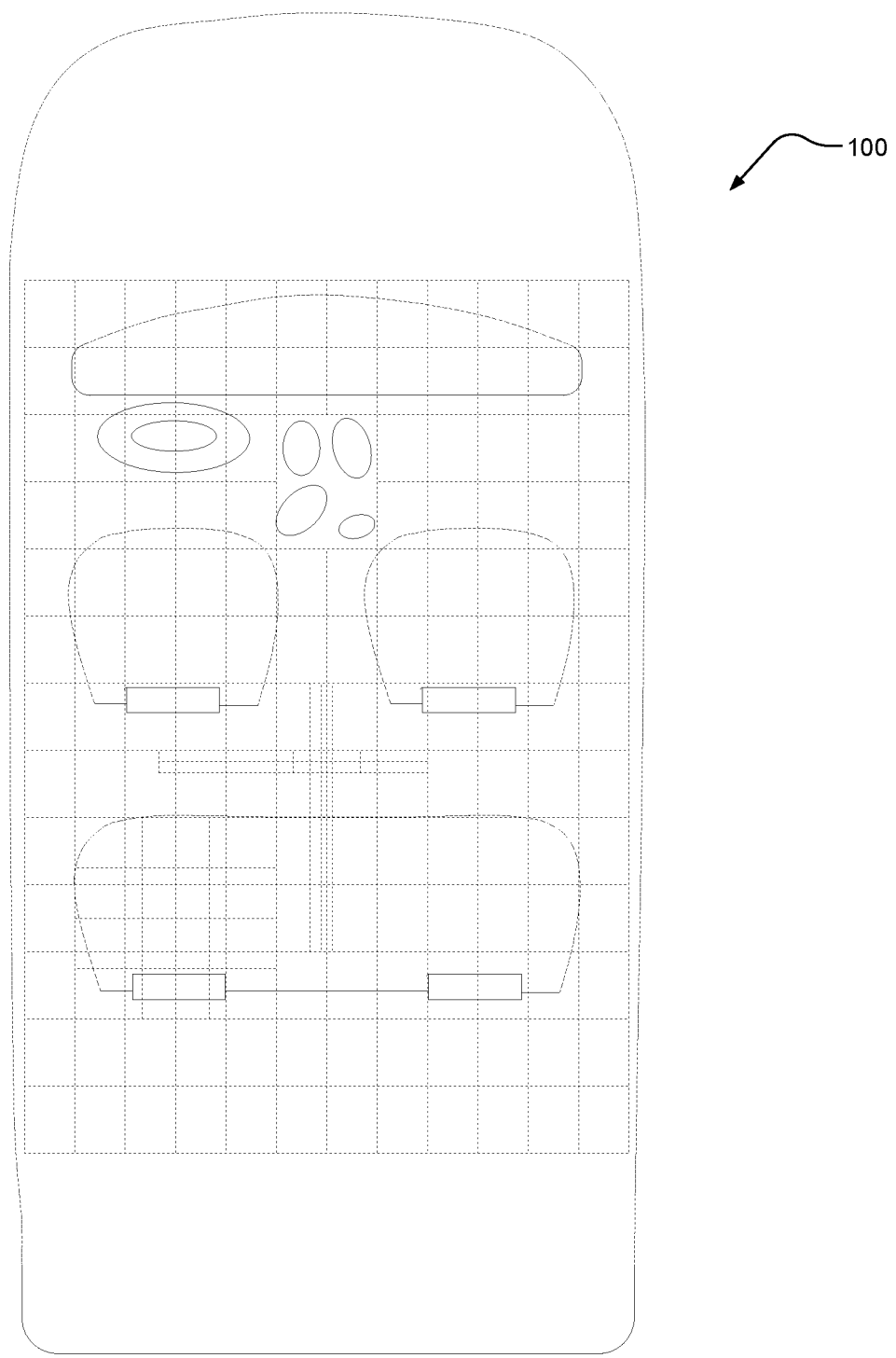
FIG. 6 is a top view of an interior of a vehicle illustrating example vehicle interior zoning in accordance with an embodiment of the present disclosure.
Figure 7:
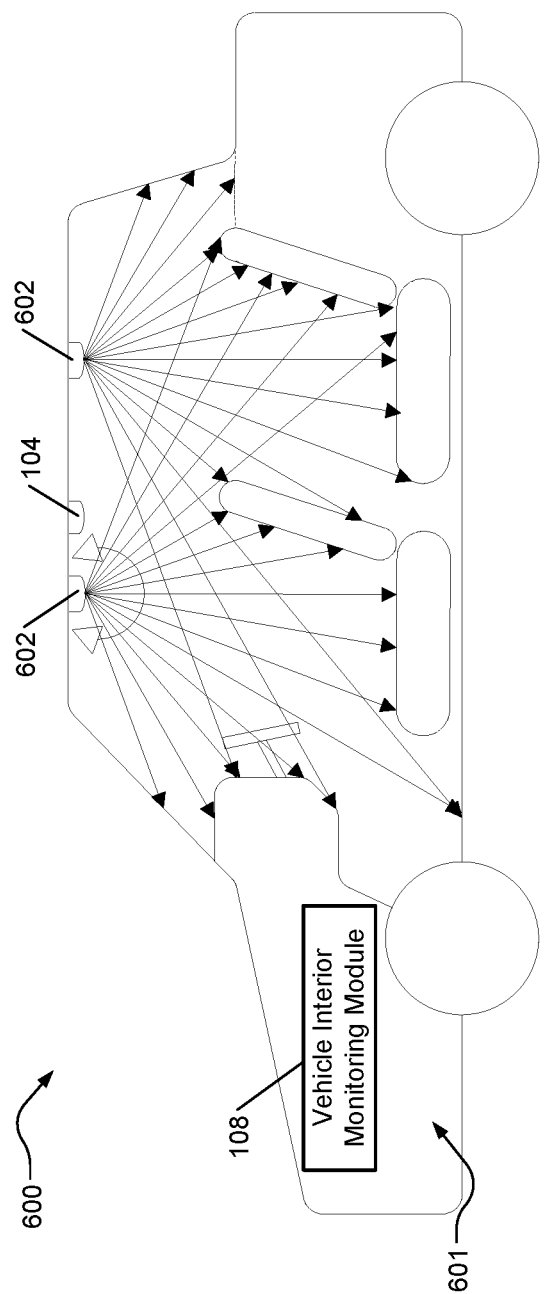
FIG. 7 is a side cross-sectional view of an example of a vehicle including a vehicle occupant safety system with a vehicle interior monitoring module and dual temperature sensing modules in accordance with an embodiment of the present disclosure.
Figure 8:
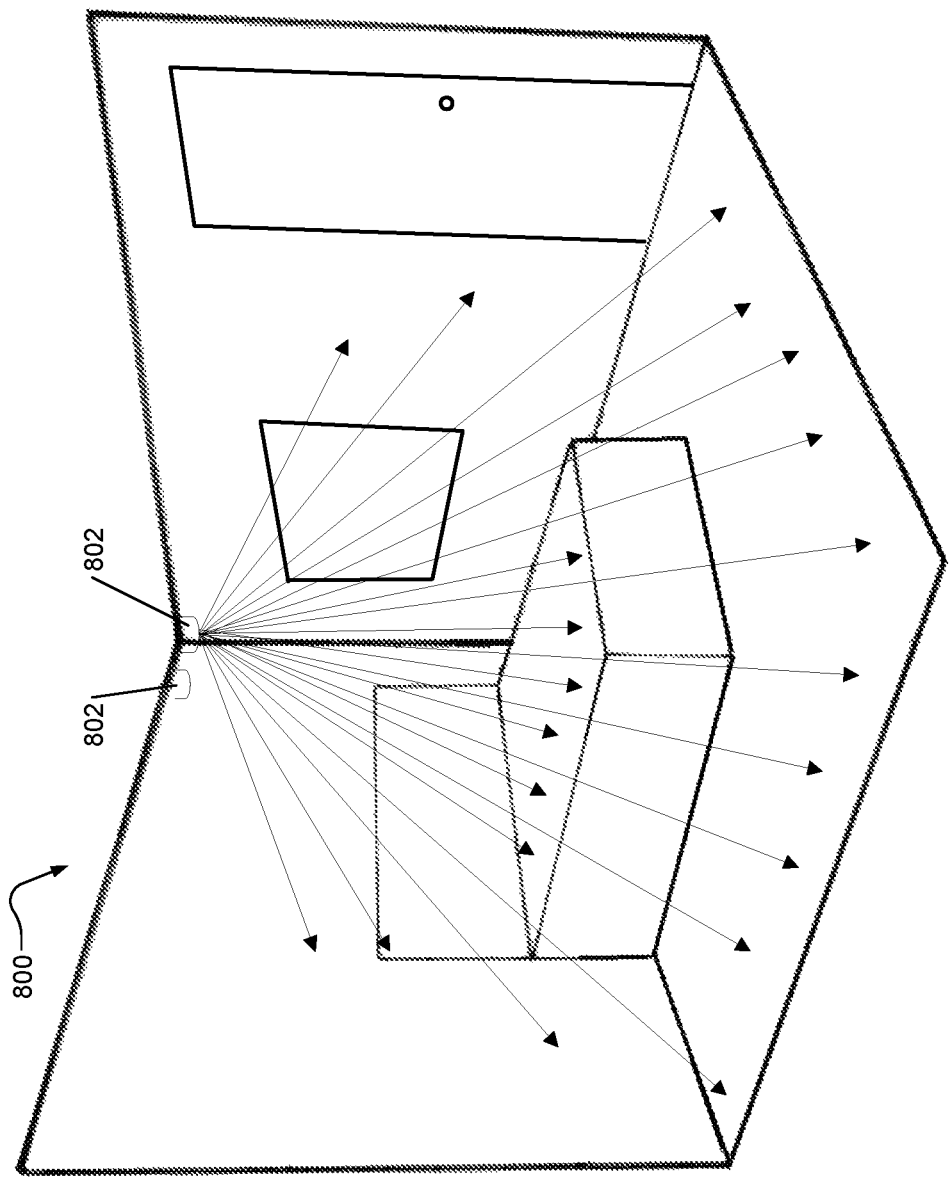
FIG. 8 is a perspective view of an interior of a room of a residential building including one or more temperature sensing modules in accordance with an embodiment of the present disclosure.

The vehicle/building 152 may be implemented similar to the other vehicles and/or buildings disclosed herein including the vehicles of FIGS. 1 and 6-7 and buildings associated with FIG. 8. The personal related network device 154 may be, for example, a mobile phone, a tablet, a wearable device, a network computer, etc. of an owner and/or user of the vehicle/building 152, a family member or friend of the owner/user, a doctor or caregiver of the owner/user, etc. The central monitoring device 156 may be, for example, a computer or server located at a central office, a vehicle dealer, a vehicle manufacturer, a third party affiliated with and/or working with the vehicle dealer and/or manufacturer, a fire department, a hospital, an emergency responder station, a police department, a doctor office, a central monitoring stations, etc. The data storage device 158 may be, for example, a server at a storage facility, a cloud-based storage device, and/or other storage device.

The interior monitoring module 108 communicates with the control modules 168, 176, 184 via the transceivers 162, 170, 178, 186. The interior monitoring module 108 detects and reports condition information and/or injuries to the control modules 168, 176, 184 and may perform other countermeasures as described below. The control modules 168, 176, 184 may respond to the interior monitoring module 108 to instruct the interior monitoring module 108 to perform countermeasures based on the received condition information. The condition information may describe a state of the interior of the space (vehicle or room) including a state of the occupant in the interior space. The condition information may include: zoning information, temperatures of an interior space; temperatures of an occupant; temperature gradients, heart rates of the occupants; breathing statuses of the occupants; an indication of whether an occupant is an intruder and/or whether an unusual movement is detected; temperature patterns of occupants; occupant movement patterns; location of the interior space (vehicle or room); and/or other condition information disclosed herein.

Each of the interfaces 164, 172, 180, 188 may include a display, a touchscreen, a keyboard, a mouse, a touchpad, and/or other user interface. The interfaces 164, 172, 180, 188 may display the alert signals and/or condition information and may receive inputs from users of the devices 154, 156, 158. The inputs may be commands to perform certain countermeasures, such as (i) open a window, a door, a roof panel, a moonroof, and/or a sunroof, (ii) activate and run an air-conditioning system, (iii) activate and run a heater, (iv) take pictures or videos, (v) make measurements, (vi) do calculations, etc. The memories 166, 174, 182, 190 may store the condition and/or injury information collected. The condition and/or injury information may be shared by the modules 108, 168, 176, 184.

Figure 3:
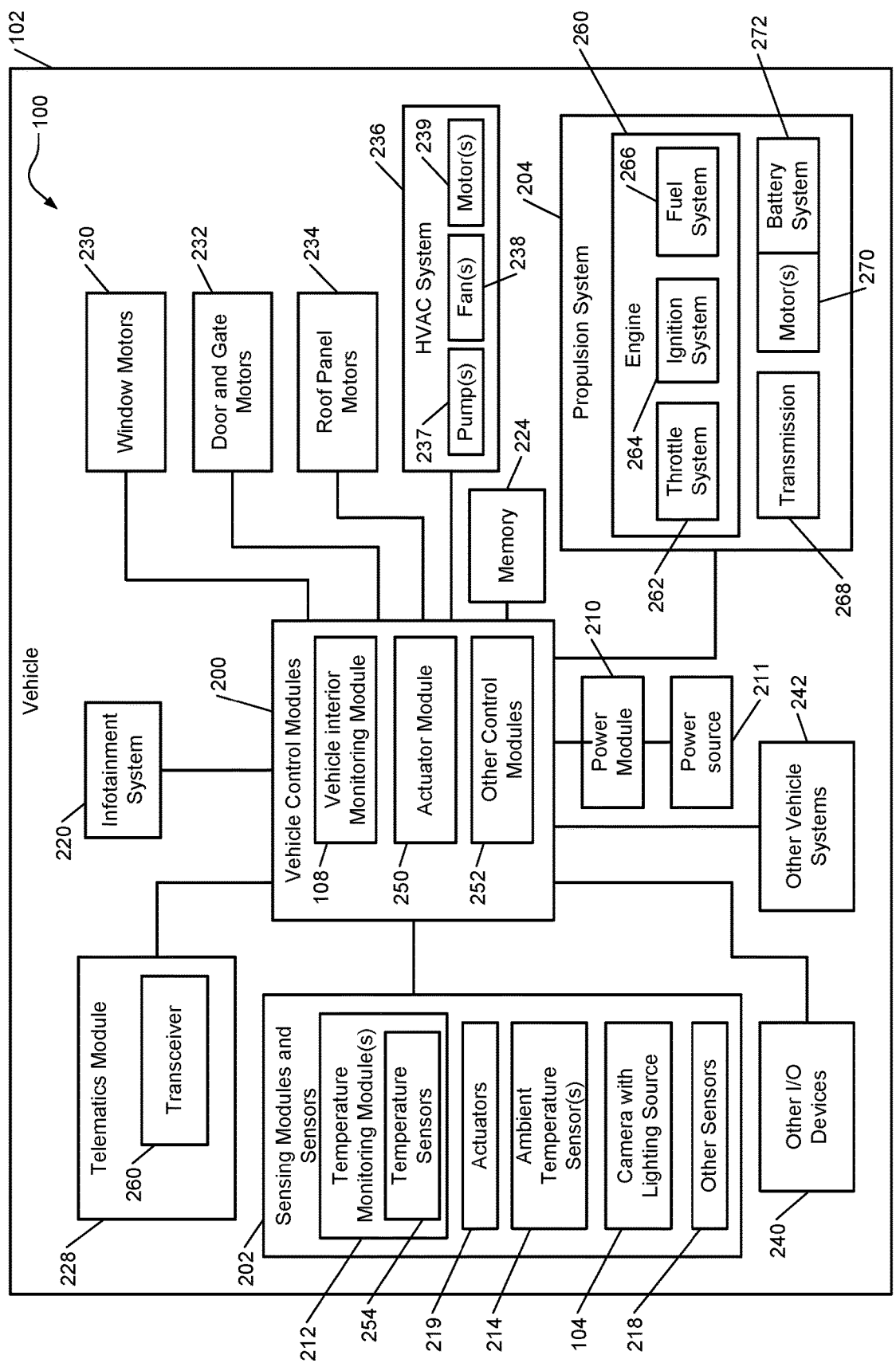
FIG. 3 is a block diagrammatic view of the vehicle occupant safety system of FIG. 1.

FIG. 3 shows the vehicle occupant safety system 100 implemented in the vehicle 102. The vehicle occupant safety system 100 includes vehicle control modules 200, sensing modules and sensors 202, a propulsion system 204, a power source 211, a telematics (or communication) module 228, window motors 230, door and gate motors 232, roof panel motors 234, a heating ventilation and air-conditioning (HVAC) system 236, an infotainment system 220, and other input and output devices 240 and vehicle system 242. The vehicle control modules 200 include the vehicle interior monitoring modules 108, an actuator module 250 and other control modules 252 (e.g., an engine control module, a transmission control module, a hybrid control module, etc.). The sensing modules and sensors 202 include: temperature monitoring modules 212, which each include one or more temperature sensors 254; ambient temperature sensors 214; the camera and lighting source 104; and other sensors 218 (e.g., seat sensors, window and door sensors, vital sign sensors, facial recognition sensors, etc.). The temperature monitoring modules 212 may include the temperature monitoring module 106 of FIG. 1.

The propulsion system 204 may include an engine 260 including a throttle system 262, an ignition system 264, a fuel system 266, a transmission 268, one or more motors 270 and/or a battery system 272. The vehicle control modules 200 may control operation of the propulsion system 260.

The power module 210 may be configured to provide various DC voltages and current levels to the vehicle control modules 200 and/or other devices, motors, etc. of the vehicle occupant safety system 100. The power module 210 may be connected to a power source 211 that includes, for example, rechargeable batteries. The power module 210 monitors amounts of power (e.g., states of charge) remaining and sends reminder signals to one of the vehicle control modules 200 to recharge the power source 211 when the amounts of power are below predetermined thresholds. In one embodiment, the power source 211 is implemented as a lithium ion battery system including one or more lithium ion batteries.

Each of the temperature monitoring modules 212 measures temperatures at multiple points in multiple zones in the vehicle 102. The temperatures are stored in the memory 224. The temperature sensors 254 may include contact and/or non-contact temperature sensors. The temperature sensors 254 may be fixed or mounted on a device or actuator that moves to measure temperature at multiple points in space. The temperature sensors 254 may include infrared thermometers, thermocouples, thermopile arrays, infrared arrays, cameras, resistance temperature detectors (RTDs), and/or other types of sensors and/or any combinations thereof. Each thermopile array may include, for example, a 16×16 sensor array to provide 256 zones.

The temperature monitoring modules 212 may be used to measure temperatures at multiple points and/or in multiple zones simultaneously and/or sequentially. The temperature monitoring modules 212 divide the interior of a vehicle into different zones and measure temperatures in the different zones. This may include dividing an interior space into zones of certain size and shape, which may be maintained at fixed values or may be adjusted and thus varied over time and space. For example, the temperature monitoring modules 212 may change the zone divisions and thus the size and/or shape of the zones at any time may change, for example, for different measurement cycles or during the same measurement cycle. The zones may be of equal size or of different sizes. The sizes of the zones may be based on, for example, predetermined priority levels and/or accuracy levels and/or based on detection of occupants. The zones of a temperature sensing module may have different size, shape, space orientation, and space angle relative to a reference point, which may be located in the temperature sensing module and/or elsewhere in the vehicle. In one embodiment, the zones are adjacent to each other such that the zones contact and/or overlap each other. In another embodiment, the zones are separated, such that there are gaps between adjacent zones. The zones may have irregular space shape and space angle. The interior vehicle surfaces and/or surfaces of an occupant (e.g., skin surfaces and/or clothing surfaces) in the zones may have different shape, space orientation, space angle, and size. A single zone may have multiple surfaces having different size, shape, space orientation, and space angle.

A temperature of a zone may refer to an average of temperatures of the different surfaces, temperatures of each surface, a temperature of one of the surfaces, and/or a temperature of a point in a zone. Any or all of the stated temperatures may be monitored. Temperatures of zones that include a surface of an occupant and temperatures of zones that do not include a surface of an occupant may be at a same temperature or at different temperatures. As an example, on a hot day, a surface temperature of an occupant may be less than a surface temperature of a seat. On a moderate temperature day, the surface temperatures may be a same temperature. On a cold day, a surface temperature of an occupant may be greater than a surface temperature of a seat.

The ambient temperature sensors 214 may include any type of temperature sensor that is capable of measuring ambient temperature inside a vehicle. The temperature monitoring module 212 may include the temperature sensors 254 and the ambient temperature sensors 214. Actuators 219 may be included and used to move one or more of the temperature sensors 254. The actuators 219 may, for example, include motors. This actuation may be controlled by one or more of the modules 108, 250. One or more of the temperature sensors 254, 214 may be configured to measure both a surface temperature and an ambient temperature.

The other sensors 218 may include a carbon dioxide $CO_2$ sensor, door open sensors, window open sensors, motion sensors, one or more vital sign sensors, facial recognition sensors, and/or other sensors to indicate states of vehicle occupants and devices and/or conditions within the vehicle 102. The vital sign sensors may include blood pressure sensors, occupant pulse sensors, occupant breathing sensors, etc. The vital sign sensors may be located in the vehicle and may be in proximity of the occupant. The vital sign sensors may include a mobile network device and/or wearable device located on the occupant and wirelessly communicating with the vehicle interior monitoring module 108.

The telematics module 228 includes one or more transceivers (one transceiver 260 is shown). The telematics module 228 wirelessly communicates with other network devices, such as the devices 154, 156, 158 of FIG. 2. The modules and devices of the system 100 may communicate, for example, using wired and/or wireless network connections, such as a car area network (CAN). The telematics module 228 may utilize cellular and/or wireless fidelity (Wi-Fi) transceivers, which may transmit and receive digital and/or analog signals. The telematics module 228 may implement wireless exchanges of occupant information by converting propagating electromagnetic waves to conducted electrical signals and vice versa. The telematics module 228 may exchange information wirelessly within a predetermined radio frequency (RF) range.

The infotainment system 220 may include a display, speakers, and/or other video and audio devices. The memory 224 may store condition and injury information as described above and other vehicle and/or occupant related information. The other I/O devices 240 may include one or more cameras, one or more lights, one or more sensors, one or more speakers, one or more buttons, a microphone, a global positioning system (GPS), and/or other I/O devices. The HVAC system 236 may include pumps 237, fans 238, and/or motors 239.

The vehicle interior monitoring module 108 may receive instructions from the memory 224, the other control modules 252, one of the devices 154, 156, 158 of FIG. 2, and/or other devices and/or modules. The vehicle interior monitoring module 108 may execute the instructions, thereby performing one or more operations or processes including those described herein, such as one or more countermeasures.

The memory 224 may store programs and/or other information for the vehicle control modules 200 and the sending modules and sensors 202. This information may be shared with the devices 154, 156, 158 of FIG. 2. The devices 154, 156, 158 may respond to warning alarms, notification signals, status signals, alert signals, and/or other signals issued by the vehicle control modules 200 including the vehicle interior monitoring module 108. In one embodiment, the vehicle interior monitoring module 108 or a similar version thereof is implemented in each of the temperature monitoring modules 212.

Figure 4:
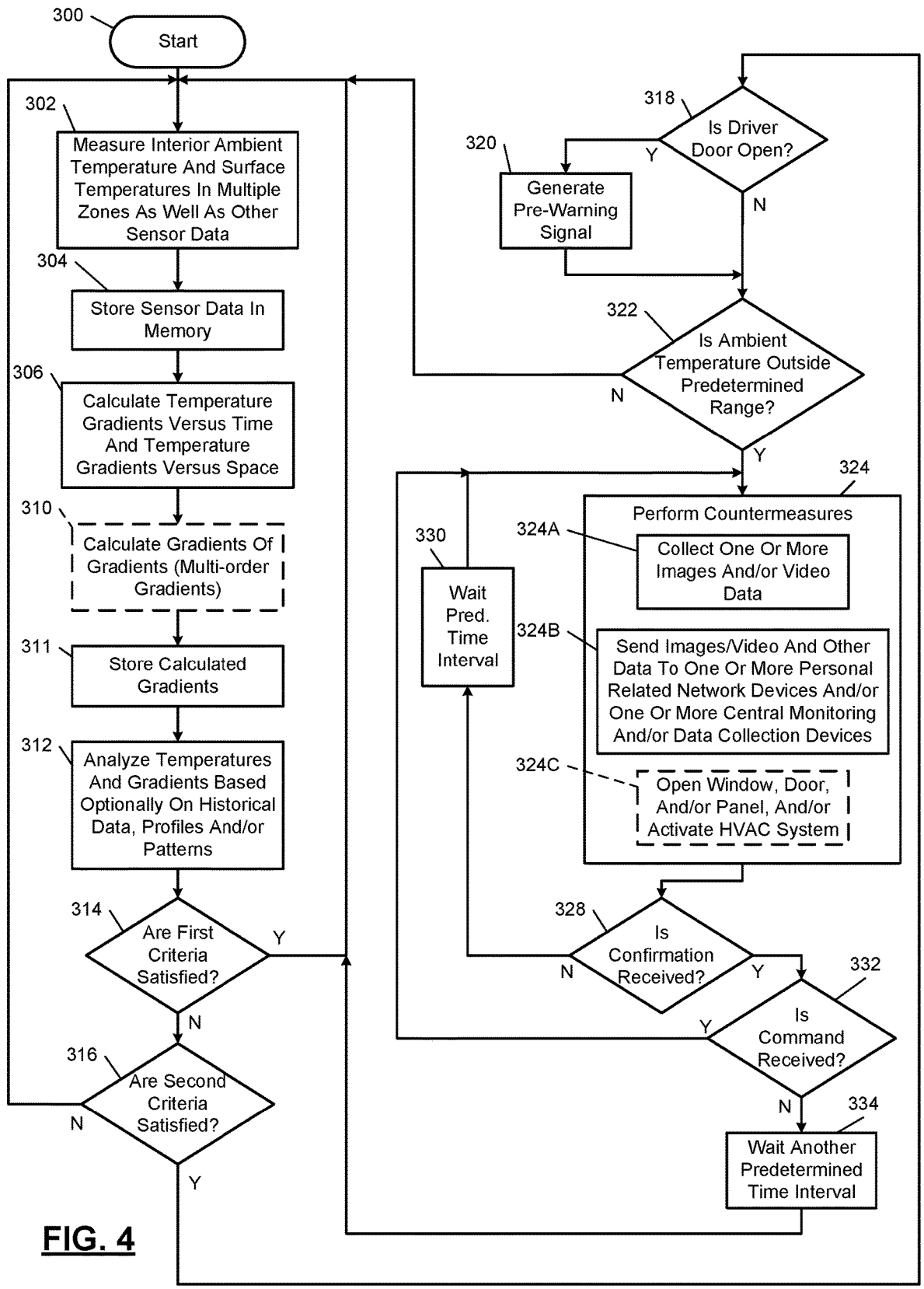
FIG. 4 illustrates an example method of operating a vehicle occupant safety system in accordance with an embodiment of the present disclosure.
Figure 10:
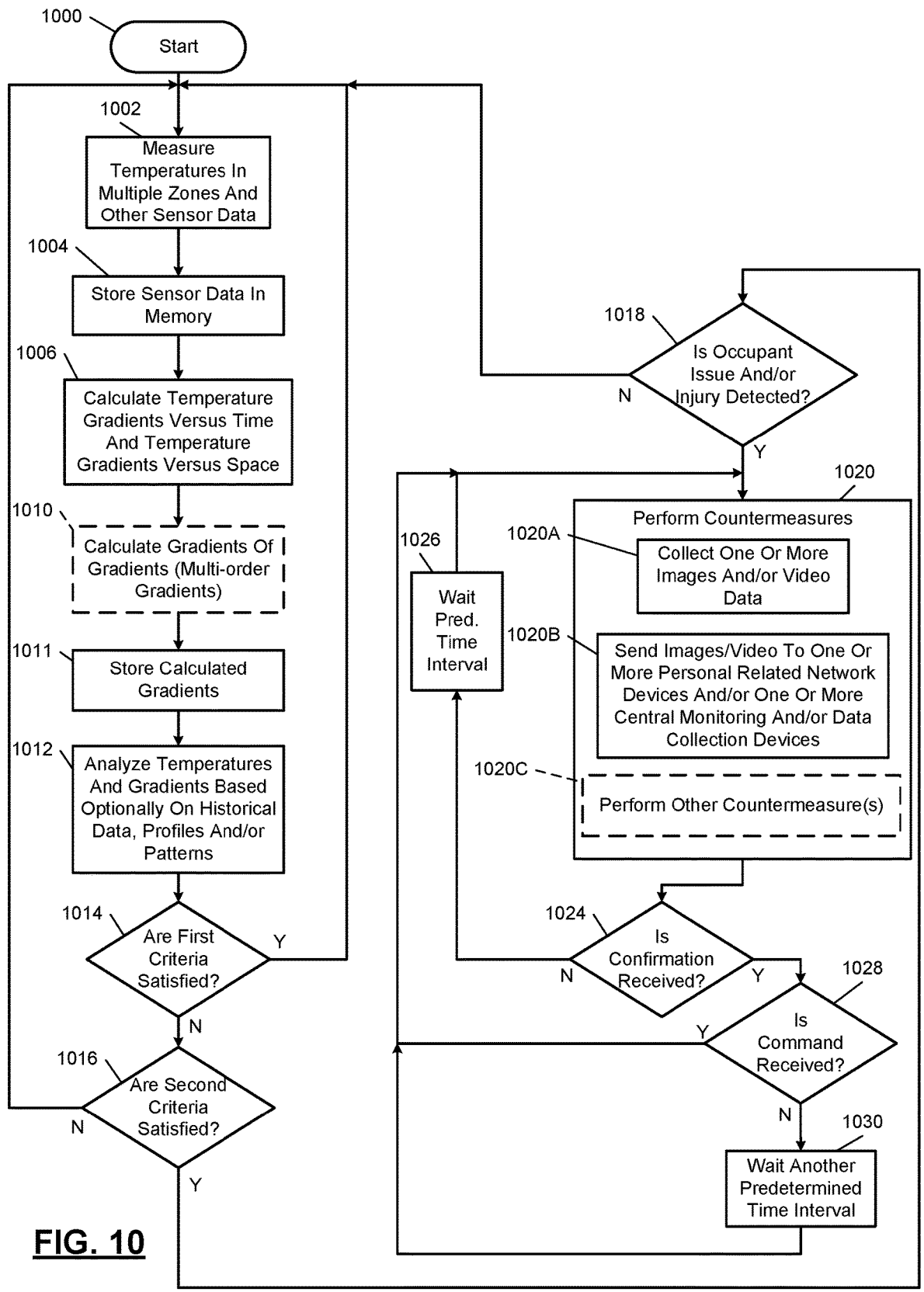
FIG. 10 illustrates an example a personal condition and/or injury response method implemented by the occupant safety system of FIG. 9 in accordance with an embodiment of the present disclosure.
Figure 11:
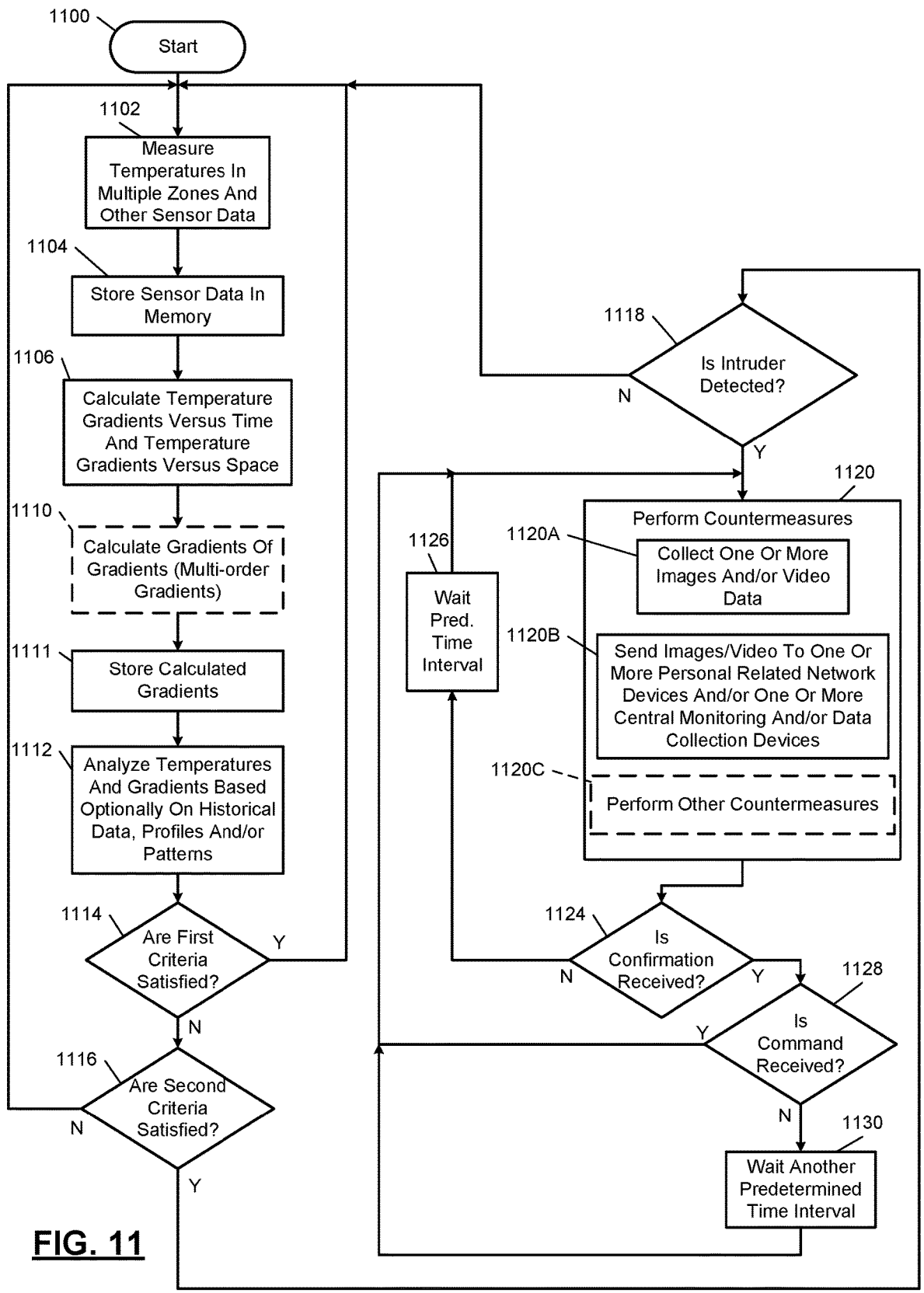
FIG. 11 illustrates an example intruder response method implemented by an occupant safety system of FIG. 9 in accordance with an embodiment of the present disclosure.

The systems disclosed herein may be operated using numerous methods, example methods are illustrated in FIGS. 4 and 10-11. In FIG. 4, a method of operating a vehicle occupant safety system (e.g., the vehicle occupant safety system 100 of FIG. 3) is shown. Although the following operations are primarily described with respect to the implementations of FIGS. 1-6, the operations may be easily modified to apply to other implementations of the present disclosure, such as the embodiment of FIG. 7. The operations may be iteratively performed. The method of FIG. 4 may include operations that are implemented by a processor of, for example, the vehicle interior monitoring module 108. The operations may be implemented as part of a program stored in the memory 224. While an exemplary process is shown, additional and/or alternative operations may be implemented.

The method of FIG. 4 may begin at 300. The method may be initiated and/or one or more of the operations of the method may be performed, for example, when the propulsion system 204, the engine 260, the motors 270 and/or other device(s) or module(s) is deactivated. The method may also or alternatively be initiated and/or one or more of the operations of the method when, for example, it is detected that the driver of the vehicle is no longer in a driver seat, the driver door is transitioned from a closed state to an open state or transitioned from an open state to a closed state. The method may also continuously run in background whenever the power module 210 is working thus the system may be able to continuously measure, calculate information associated with, and monitor a space before, during, and after one or more occupant(s) are present in the space. This is done to detection occupant conditions (e.g., no occupant, occupant entering, occupant presence, occupant moving, occupant not moving, occupant sleeping, occupant exiting, etc.).

At 302, the ambient temperature sensor 214 and the temperature sensors 254 measure a vehicle interior ambient temperature and temperatures at multiple points in multiple zones within an interior of a vehicle. Other sensors may also be monitored including the carbon dioxide $CO_2$ sensor, the seat sensors, the door open sensors, the window open sensors, the motion sensors, facial recognition sensors, one or more vital sign sensors, and/or other sensors to indicate states of vehicle occupants and devices and/or conditions within the vehicle 102. At 304, the vehicle interior monitoring module 108 may save the measured temperatures in the memory 224 and/or other memory.

At 306, the vehicle interior monitoring module 108 calculates temperature gradients versus time (referred to as "time gradients") and temperature gradients versus space (referred to as "space gradients"). The time gradients indicate temperature changes over time for each of the points and/or zones monitored. The time gradients indicate rates at which temperature increase, decrease, and/or fluctuate. The space gradients indicate temperature differences between different points and/or zones. The space gradients may be determined for differences between adjacent zones and used to, for example, detect location and movement of an occupant. In certain conditions, example hot days or cold days, surface temperatures within a vehicle as compared to surface temperature of an occupant are different and change at different rates. Skin and hair temperatures of an occupant tend to remain constant or change at a slow rate as compared to surface temperatures within a vehicle. Temperatures of clothing worn by an occupant change at a quicker rate than skin temperatures, but typically at a slower rate than other surface temperatures (e.g., seat surface temperatures, instrument panel temperatures, center console temperatures, door temperatures, window temperatures, etc.) in the vehicle.

As an example, when an occupant is not moving (e.g., the occupant is sleeping) temperature gradient versus time values and temperature gradient versus space values may have minimal change. Unless it is a hot or cold day in which case cabin temperatures can be quickly increasing or decreasing. When this occurs, the skin and hair temperatures of the occupant slowly increase or decrease, where as other temperatures increase or decrease at quicker rates.

As another example, when an occupant moves, time gradients and the space gradients change regardless of outside temperatures and conditions (e.g., a sunny or cloudy day). If the occupant remains in a first zone for N minutes and not in a second zone, the time and space gradient values for the N minutes for the first zone and for the second zone may be approximately the same. If however the occupant moves from the first zone to the second zone, at N+1 minutes the time gradients and the space gradients for the first zone and the second zone change. Based on these changes, the vehicle interior monitoring module 108 may detect the movement, the direction of the movement, determine at 312 the location of the occupant.

At 310, the vehicle interior monitoring module 108 may calculate (i) gradients of gradients and (ii) distances for (or changes in) temperature and temperature gradients. For example, the vehicle interior monitoring module 108 may determine gradients of the time gradients (differences between two or more time gradients) and/or gradients of the space gradients (differences between two or more space gradients). In one embodiment, the vehicle interior monitoring module 108 determines one or more of each of: a time gradient of space gradients (or a difference between changes in a space gradient over time), a time gradient of two time gradients (or a difference between two time gradients for a same space (or zone)), a space gradient of space gradients (or a difference between two space gradients), and/or a space gradient of time gradients (or a difference between a time gradient of a first space and a time gradient of a second space). A time gradient and a space gradient refer to a first order gradient. A gradient of a gradient refers to a second order or higher gradient. Any order (1, 2, 3, 4 . . . ) of time and space gradients may be determined. Determining gradients of gradients as described can improve system efficiency.

The vehicle interior monitoring module 108 may implement an algorithm to calculate distances for temperature and temperature gradients. The calculated distances may include measuring changes in parameters. For example, if a temperature does not change then a calculated distance for the temperature is zero. The more the temperature changes, the larger the calculated distance. As another example, if there is no occupant inside a vehicle, a first temperature distance indicates a measurement system performance (measuring error) and heat transfer between the environment and the vehicle. If however there is an occupant in the vehicle and the occupant moves, then a second distance may be calculated and be greater than the first distance because the second distance is also representative of changes caused by the occupant's movement. If the occupant stays inside the vehicle and does not move, then some sets of distance associated with the non-moving occupant (e.g., time gradient where the occupant is) may be smaller than other sets of distance associated with the vehicle when there was no occupant. Some sets of distance associated with the non-moving occupant (e.g., space gradient where the occupant is) may be greater than some sets of distance associated with no occupant.

At 311, the gradients and distances determined at 306 and 310 are stored in the memory 224 and/or other memory.

At 312, the vehicle interior monitoring module 108 analyzes the temperatures and temperature gradients detected and calculated at 302, 306 and 310. This data may be analyzed based on historical data and/or previously stored and identified temperature and gradient patterns and/or profiles. This may include comparing temperature and/or gradient patterns and profiles of the data collected and calculated above to historical and/or previously stored patterns and profiles of occupants and the interior of the vehicle. As an example, a temperature profile of an occupant may be stored in memory and compared with a temperature profile of a current occupant to identify whether the occupant is present, determine whether the occupant is a child or a pet, determine location of the occupant, etc. Artificial intelligence (AI) may be used to distinguish between different patterns and profiles and to learn over time and identify states and conditions.

At 314, the vehicle interior monitoring module 108 determines whether first criteria are satisfied. This may include determining if at least some of the temperatures and/or gradients are within first predetermined ranges and/or whether the temperatures and/or gradient patterns and profiles match a first set of patterns and profiles. If the first criteria are satisfied, operation 302 may be performed, otherwise operation 316 may be performed. Returning to operation 302 may occur, for example, when the probability of an issue existing is below a predetermined probability level and/or when no potential issue exists. The probability of an issue existing may be determined based on whether the temperatures and/or gradient patterns and profiles match the first set of patterns and profiles and/or how close the temperature and or gradient patterns and profiles are to the first set of patterns and profiles. The ranges for different subsets of data may not be the same. Artificial intelligence (AI) may be used to distinguish between different patterns and profiles and to learn over time and identify states and conditions and/or whether the first criteria are satisfied.

At 316, the vehicle interior monitoring module 108 determines if second criteria are satisfied. This may include determining if at least some of the temperatures and/or gradients are within second predetermined ranges and/or whether the temperatures and/or gradient patterns and profiles match a second set of patterns and profiles. At least some of the second predetermined ranges and/or second set of patterns and profiles are different than the corresponding first predetermined ranges and/or first set of patterns and profiles. If the second criteria are satisfied, operation 318 may be performed, otherwise operation 302 may be performed. Returning to operation 302 may occur, for example, when the probability of an issue existing is below a second predetermined probability level and/or when no potential issue exists. The probability of an issue existing may be determined based on whether the temperatures and/or gradient patterns and profiles match the second set of patterns and profiles and/or how close the temperature and or gradient patterns and profiles are to the second set of patterns and profiles. The ranges for different subsets of data may not be the same. Artificial intelligence (AI) may be used to distinguish between different patterns and profiles and to learn over time and identify states and conditions and/or whether the second criteria are satisfied.

By performing operations 312, 314 and 316, the vehicle interior monitoring module 108 is able to determine whether an occupant or occupants are inside the vehicle, the location (e.g., on passenger seat, on back seat, on a back floor, etc.) of the occupants and whether the occupants are moving between locations in the vehicle. As an example, by monitoring temperatures in different zones, the vehicle interior monitoring module 108 is able to detect presence of an occupant. By monitoring temperature gradients in time and space, the vehicle interior monitoring module 108 is able to determine the location and movement of the occupant.

At 318, the vehicle interior monitoring module 108 may determine if a driver side door is open. If the drive side door is open, then operation 320 is performed, otherwise operation 322 is performed. This allows the vehicle interior monitoring module 108 to determine if a driver is leaving the vehicle. This decision may also be based on whether, for example, a key fob of the vehicle has moved and is no longer within the vehicle, whether the ignition of the vehicle has been deactivated, and/or based on other indications that the driver of the vehicle is leaving the vehicle.

At 320, when the driver side door is open, the vehicle interior monitoring module 108 may generate a warning signal to the driver indicating that "an occupant is in the vehicle" to remind the driver that, for example, a child or pet is in the vehicle. The warning signal may be provided via, for example, the infotainment system 220, vehicle lights, the personal related network device 154, and/or via a different system, module and/or device.

At 322, the vehicle interior monitoring module 108 may determine if the ambient temperature within the vehicle is outside a predetermined range (e.g., greater than a first predetermined temperature (e.g., 35° C.) or less than a second predetermined temperature (e.g., 40° C.)). If the ambient temperature is not outside the predetermined range, then operation 302 may be performed, otherwise operation 324 may be performed. Other parameters may also be analyzed, for example, the data from the carbon dioxide $CO_2$ sensor and the one or more vital sign sensors may be analyzed to determine if one or more of the parameters are outside of predetermined ranges. When outside of the predetermined ranges, an issue may exist and as a result operation 324 may be performed. As an alternative or in addition, the vehicle interior monitoring module 108 may determine whether a predetermined period has lapsed since the driver door was opened or closed and if the predetermined period has lapsed, operation 324 may be performed. This may be done to limit an amount of time an occupant is left in the vehicle.

At 324, the vehicle interior monitoring module 108 may perform one or more countermeasures. For example, at 324A, the vehicle interior monitoring module 108 may turn on the light of the camera with lighting source 104 and capture one or more images and/or record video of the interior of the vehicle. This includes taking images and/or video of the detected one or more occupants. At 324B, the vehicle interior monitoring module 108 may transmit the images and/or video to one or more of the devices 154, 156, 158. The vehicle interior monitoring module 108 may also send other data including data collected from any of the sensors modules and sensors 202 and/or parameters and/or status information determined based on the collected data.

In one embodiment, the images, video and/or other data are sent in the form of a warning signal to a mobile network device of the driver and/or user of the vehicle to remind the driver and/or user of the occupants, states of the occupants, and conditions within the vehicle. This allows the driver and/or user to return to the vehicle and/or to remotely control operations of the vehicle, such as open doors, windows, roof panels, run the HVAC system 236 and/or adjust the ambient temperature within the vehicle via the mobile network device. In one embodiment, the vehicle interior monitoring module 108 waits a predetermined period of time, which may be based on the conditions within the vehicle and/or the state of the vehicle occupants. If the driver and/or user of the vehicle does not return to the vehicle and/or respond by commanding that certain countermeasures be performed, the vehicle interior monitoring module 108 may at 324C perform one or more countermeasures. The vehicle interior monitoring module 108 may then perform one of more countermeasures without input from the driver and/or user: open a window; unlock or open a door; open a roof panel; activate the HVAC 236 and adjust temperature within the vehicle; send a notification signal to one or more other ones of the devices 154, 156, 158; and/or perform some other countermeasures, such as signaling the remotely located central monitoring device 156 and/or one of the personal related network devices 154. The notification signal(s) sent to the devices 154, 156, 158 may include information indicating states of the occupants, states of the devices of the vehicle, location of the vehicle, and/or the conditions within the vehicle. The other countermeasures may include turning on vehicle lights, honking a vehicle horn, playing audible messages over speakers, etc. Any of the devices 154, 156, 158 may signal the vehicle monitoring module 108 to perform one of the stated countermeasures.

The vehicle interior monitoring module 108 may send the warning and notification signals to predefined receivers of certain ones of the devices 154, 156, 158 via the telematics module 228. As an example, the signals may be sent to network devices of a police department, a fire department, a vehicle owner, friends and family of the vehicle owner, a caregiver, a monitoring station, etc.

At 328, the vehicle interior monitoring module 108 may determine if a confirmation and/or response signal is received from one or more of the devices 154, 156, 158. If yes, then operation 332 may be performed, otherwise operation 330 may be performed. At 330, the vehicle interior monitoring module 108 waits a first predetermined time interval before proceeding to operation 324.

At 332, the vehicle interior monitoring module 108 may determine whether a response signal and/or command is received from one or more of the devices 154, 156, 158. If yes, the vehicle interior monitoring module 108 may proceed to operation 324 to perform one or more countermeasures, which may have been commanded by the one or more devices 154, 156, 158, otherwise operation 334 may be performed.

At 334, the vehicle interior monitoring module 108 may wait a second predetermined time interval before returning to operation 302. In an embodiment, the method is iteratively performed and the above-stated operations are performed while an occupant remains in the vehicle.

Figure 5:
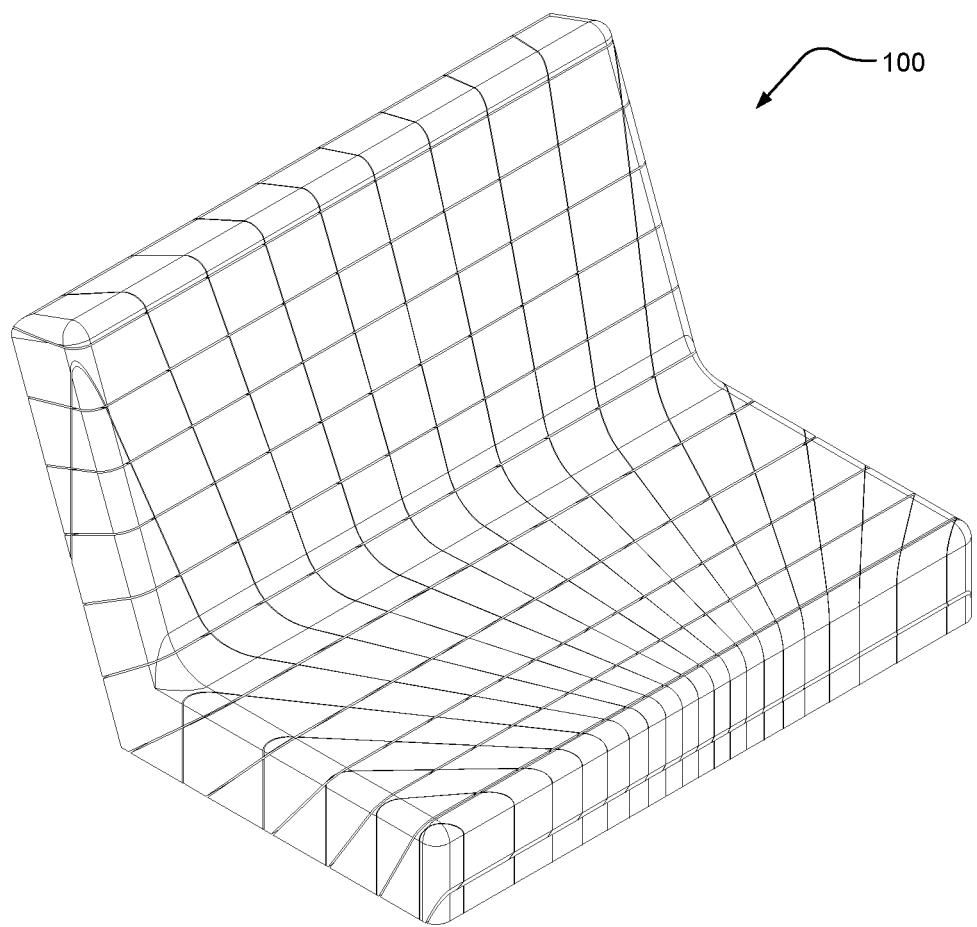
FIG. 5 is a perspective view of a seat illustrating example seat zoning in accordance with an embodiment of the present disclosure.

The vehicle interior monitoring module 108 may divide the interior of the vehicle and measures temperature at different zones. FIG. 5 shows a seat illustrating example seat zoning. The zoning may be provided via one or more of the temperature monitoring modules monitoring modules 106 and/or temperature monitoring modules 212 of FIGS. 1-2. The example seat zoning may be for a back seat of a vehicle. The zoning may change at any time with different cycles of temperature measurement or during one measurement cycle. Zones may be 3 dimensional. The zones may have different size, shape, space orientation, and space angle. The zones may not connect to each other. Those zones may have irregular space shape and angle. The surfaces at those zones may have different shape, space orientation and angle, and size. One zone may have multiple surfaces that may have different size, shape, space orientation, and space angle.

FIG. 6 shows an interior of a vehicle illustrating example vehicle interior zoning. The zoning may be provided via one or more of the temperature monitoring modules monitoring modules 106 and/or temperature monitoring modules 212 of FIGS. 1-2. Although a top view of zoning that covers the whole interior of a vehicle is shown, the interior of the vehicle may be segmented into two or more zones.

FIG. 7 is a side cross-sectional view of an example of a vehicle 600 including a vehicle occupant safety system 601 with the vehicle interior monitoring module 108 and dual temperature monitoring modules 602. The temperature monitoring modules 602 measures parameters of respective zones. The zones monitored by the temperature monitoring modules 602 may overlap. In this example the temperature monitoring modules 602 may be actuated and/or mounted on an actuator (e.g., one of the actuators 219) to rotate one or more temperature sensors thereof. The light source 104 is also shown. The actuators may include linear, angular, and/or other types of actuators.

The temperature monitoring modules 602 may be mounted in various locations such as in a ceiling, in walls, at windows and/or doors, in a floor, etc. The temperature monitoring modules 602 may be mounted on different planes and/or at different elevations.

FIG. 8 shows another example implementation of the systems, modules and devices disclosed herein. A room 800 of a residential building including one or more temperature monitoring modules 802 is shown. As an example, the vehicle occupant safety system 100 of FIG. 3 may be modified to provide the occupant safety system 900 shown in FIG. 9 and applicable to the room 800 of FIG. 8. The temperature monitoring modules 802 may be used to measure temperatures at multiple points inside the room 800 and detect occupants and be used to monitor movement of the occupants. The system 900 may be installed in a building 902 and/or a room of the building 902, such as the room 800. The system 900 may include sensing modules and sensors 903. A camera with lighting source 904 and a temperature monitoring module(s) 906 may be used to monitor multiple measurement zones in the room 800. The temperature monitoring module 906 may include (i) a power module 908 that receives power from a power source 910, (ii) zone temperature sensors 912 including one or more multi-point temperature sensors, (iii) an ambient temperature sensor 914, (iv) the camera with lighting source 904, (v) other sensors 918, (vi) one or more control modules 922, (vii) a memory 924 storing programs and data, (viii) a display 926, (ix) an alarm 928, (x) at least one input/output (I/O) device 930, and a communication device (or transceiver) 932, as described in more detail with respect to FIG. 8. Actuators 933 may be included for actuating the one or more of the temperature monitoring modules 906 and/or temperature sensors 912. The control modules 922 may include an inter monitoring module 940, an actuator module 942 and other control modules 944, which may operate similarly as the modules 108, 250 and 252 of FIG. 3. The occupant safety system 900 may further include window (locking and opening) actuators 946, door (locking and opening) actuators 948, and an HVAC system 950, which may include pumps 952, fans and/or blowers 954, and motors 956.

The occupant safety system 900 may interact with various network devices, central monitoring devices, and data storage devices, such as any of the devices 154, 156, 158 of FIG. 2. These devices may be operated, owned by and/or controlled by various users including device owners, building (or resident) owners, family members, care givers, doctors, nurses, emergency responders, etc. The central monitoring devices may be implemented at, for example, a police department, a fire department, a monitoring station, a remote server, etc. The data storage devices may be implemented as part of cloud storage and/or remote servers.

Figure 9:
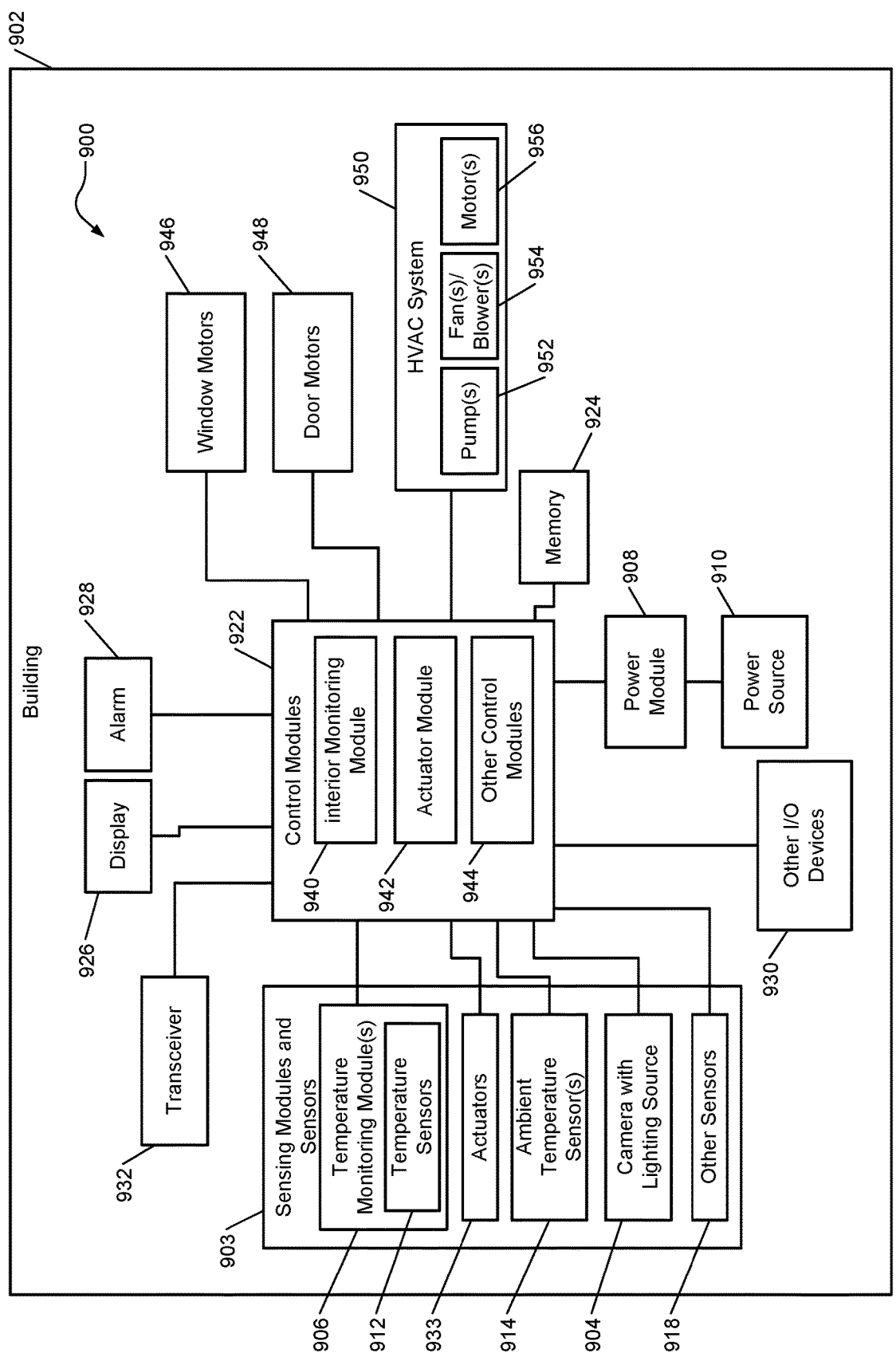
FIG. 9 is a block diagrammatic view of an example of a building including an occupant safety system in accordance with an embodiment of the present disclosure.

The temperature monitoring modules 802 of FIG. 8 may be implemented as part of the occupant safety system of FIG. 9. The power module 908 may be configured to provide DC power received from, for example, a lithium ion battery system of the power source 910. If the system 900 uses rechargeable batteries, the power source may monitor the power remaining and give reminder signals to recharge batteries once the batteries are low. The memory 924 may store temperature values and other information, as described above with respect to the memory 224. The I/O devices 930 may include, but is not limited to one or more cameras, one or more lights, one or more sensors, one or more speakers, one or more buttons, microphone, GPS device, or a combination thereof.

The transceiver 932 may communicatively connect the modules and/or devices of system 900, for example, using any type of wired or wireless network connection. The transceiver 932 may include a single transceiver or a combination of transmitters and receivers, modems, switches, and/or other wired and wireless communication devices. The wireless communication may include cellular, Wi-Fi, Bluetooth, wireless local area network (WLAN), and/or other wireless communication and associated communication protocols. The transceiver 932 may be used for digital or analog signal transfers. The transceiver 932 may wirelessly exchange occupant status information by, for example, converting propagating electromagnetic waves to and from conducted electrical signals. The transceiver 932 may exchange information wirelessly using radio waves over a radio range or network that enables such communication.

The interior monitoring module 940 may receive instructions from memories such as memory 924, remote servers, and/or cloud storage devices and execute the instructions, thereby performing one or more operations or processes including those described herein. The interior monitoring module 940 may include any computer hardware or combination of computer hardware and software that is configured to perform the operations of the devices, systems, and processes described herein. As an example, one or more of the modules 922, 940, 942, 944 may include and/or be implemented as a single, dual, triple, or quad core microprocessor (on one or more chips). One or more of the modules 922, 940, 942, 944 may include or be implemented as a graphics processing device, a visual processing device, and/or a virtual processor.

Memories disclosed herein, such as memories 224, 924 may include any computer-readable medium (also referred to as a processor-readable medium). The computer-readable medium may include any non-transitory (e.g., tangible) medium that provides information and/or instructions and is able to be read by, for example, a processor.

The temperature measurement unit 912 may include any type, contact or non-contact, temperature sensor that measures temperature. The temperature sensor(s) may be fixed or mounted on a device that moves to measure temperature at multiple points and/or multiple zones. The temperature sensor(s) may include infrared thermometer, thermocouples, thermopile arrays, cameras, infrared arrays or any combinations of them.

The temperature monitoring modules 906 measure temperatures at multiple points simultaneously and/or sequentially. The temperature monitoring modules 906 divide the interior of a space into different zones and measure temperatures in the different zones. The divisions of zones may or may not be fixed. The temperature monitoring modules 906 may change zone divisions for different measurement cycles or during the same measurement cycles. The zones may have different size, shape, space orientation, and space angle. The zones may not be adjacent each other and/or may be 3 dimensional. The zones may have irregular space shape and angle. The surfaces at the zones may have different shape, space orientation and angle, and size. One zone may have multiple surfaces that may have different size, shape, space orientation, and space angle.

The ambient temperature sensor 914 may measure ambient temperature inside the room 800. The temperature monitoring modules 906 and the ambient temperature sensor 914 may be implemented as a single module and/or device performing multiple different functions. The data storage devices may store programs and/or other information for the temperature monitoring modules 906. The central monitoring devices may respond to warning alarms issued by, for example, the interior monitoring module 940 and/or one or more of the devices 154, 156 of FIG. 2. The interior monitoring module 940 may also perform countermeasures based on states (e.g., vital sign states) of occupants and/or if one or more of the occupants are an intruder. The countermeasures may include, for example, opening a window, a door, unlocking a window or a door, signaling an alarm, sending a warning signal, and/or sending an alert signal to one or more of the devices 154, 156.

FIG. 10 shows a personal condition and/or injury response method implemented by the occupant safety system 900 of FIG. 9. The operations of FIG. 9 may be implemented by, for example, the interior monitoring module 940 and/or other module and/or device of the system 900. One or more of the operations may be performed based on execution of program code stored in the memory 924 and executed by the one of the control modules 922. The method may take many different forms and include multiple and/or alternate operations. While an exemplary process is shown, the exemplary operations illustrated are not intended to be limiting. Indeed, additional or alternative operations may be implemented. Although the following operations are primary directed to the implementations of FIGS. 8-9, the operations are applicable to other embodiments of the present disclosure.

The method may begin at 1000. At 1002, the interior monitoring module 940 may measure room interior ambient temperature and temperatures at multiple zones in the room 800, as well as other sensor data. At 1004, the interior monitoring module 940 may save all measured sensor values into memory 924.

At 1006, the interior monitoring module 940 may calculate temperature gradients versus time and space as described above. At 1010, the interior monitoring module 940 may calculate gradients of gradients, as described above. The interior monitoring module 940 may also calculate distances for (or changes in) temperature and temperature gradients. At 1011, the determined gradient values may be stored in the memory 924.

At 1012, the interior monitoring module 940 may analyze the temperatures, temperature gradients, and gradients of gradients measured and determined at 1002, 1006 and 1010 and corresponding history values thereof. This data may be analyzed based on historical data and/or previously stored and identified temperature and gradient patterns and/or profiles. This may include comparing temperature and/or gradient patterns and profiles of the data collected and calculated above to historical and/or previously stored patterns and profiles of occupants and the interior of the room 800. As an example, a temperature profile of an occupant may be stored in memory and compared with a temperature profile of a current occupant to identify whether the occupant is present, determine whether the occupant is a child or a pet, determine location of the occupant, etc. This analysis may be performed to determine if the occupant is behaving normal for the current day and time of day. The analysis may be done to check temperatures of the occupants and/or to determine if the temperatures are outside certain predetermined ranges and/or are changing at an unusual rate. The analysis may be performed to determine if the occupant is an occupant not typically in the room 800 for the current day and time and/or is behaving differently than an occupant normally behaves. Artificial intelligence (AI) may be used to distinguish between different patterns and profiles and to learn over time and identify states, behaviors and conditions.

At 1014, the interior monitoring module 940 may determine if first criteria are satisfied including whether some subsets of the temperature, temperature gradient, distances, and/or other parameters are within first predetermined ranges. The ranges for different subsets may not be the same. Temperatures and/or gradient patterns and profiles may also be compared to a first set of patterns and profiles, as similarly described above. If the subsets are within certain ranges and/or there is a match to the first set of patterns and profiles, then operation 1002 is performed, otherwise operation 1016 may be performed. Returning to operation 1002 may occur, for example, when a probability of an issue existing is below a predetermined probability level and/or when no potential issue exists. The probability of an issue existing may be determined based on whether the temperatures and/or gradient patterns and profiles match the first set of patterns and profiles and/or how close the temperature and or gradient patterns and profiles are to the first set of patterns and profiles. Artificial intelligence (AI) may be used to distinguish between different patterns and profiles and to learn over time and identify states and conditions and/or whether the first criteria are satisfied.

At 1016, the interior monitoring module 940 may determine if a second set of predetermined criteria is satisfied. This may include determining if some subsets of the temperature, temperature gradient, distances, and/or other parameters (these subsets may not be the same subsets as in operation 1014) are within second predetermined ranges (again these ranges may not be the same as in operation 1014). The ranges for different subsets may not be the same. Temperatures and/or gradient patterns and profiles may also be compared to a second set of patterns and profiles, as similarly described above. Temperatures and/or gradient patterns and profiles may also be compared to a second set of patterns and profiles, as similarly described above. If the subsets are within certain ranges and/or there is a match to the second set of patterns and profiles, then operation 1018 is performed, otherwise operation 1002 is performed. Operations 1014 and 1016 may be performed to determine whether one or more are present in the room 800, as well as to determine the location of the occupants and whether the occupants are moving. Other aspects of the occupants may also be determined. The interior monitoring module 940 may monitor movement and behavior of the occupants, as well as states of the occupants. Returning to operation 1002 may occur, for example, when a probability of an issue existing is below a predetermined probability level and/or when no potential issue exists. The probability of an issue existing may be determined based on whether the temperatures and/or gradient patterns and profiles match the second set of patterns and profiles and/or how close the temperature and or gradient patterns and profiles are to the second set of patterns and profiles. Artificial intelligence (AI) may be used to distinguish between different patterns and profiles and to learn over time and identify states and conditions and/or whether the second criteria are satisfied.

At 1018, the interior monitoring module 940 may determine whether an occupant has an issue (or potential issue) and/or whether an occupant is injured (e.g., the occupant has fallen). At 1020, the interior monitoring module 940 may perform one or more countermeasures. For example, at 1020A, the interior monitoring module 940 may turn on the light for the camera 904 and take pictures and/or video with the camera. At 1020B, the interior monitoring module 940 may send the pictures or videos and warning signals to predefined receivers of one or more of the devices 154, 156, 158 via the transceiver 932, such as to a police department, a fire department, a home owner, a friend, a caregiver, a monitoring station, etc. The warning signals sent to the devices 154, 156, 158 may include information indicating: states of the occupants; states of the devices of the space; location of the space; and/or the conditions within the space. At 1020C, the interior monitoring module 940 may also take other actions, such as to turn on warning lights, speaker, unlock or lock windows and/or doors, send an alarm signal to one or more central monitoring devices, adjust operation of the HVAC system 950, etc.

At 1024, the interior monitoring module 940 may determine if a confirmation is received from one of the devices 154, 156, 158. If a confirmation is not received, then operation 1026 is performed, otherwise operation 1028 is performed. At 1026, after a predefined time interval, if the system 900 does not receive a confirmation from one of predefined devices 154, 156, 158, then operation 1020 is performed.

At 1028, the interior monitoring module 940 determines whether a command is received from one of the devices 154, 156, 158. If a command is received, the operation 1020 is performed, otherwise operation 1030 is performed. At 1030, the interior monitoring module 940 may wait another predetermined time interval and then proceed to operation 1002. This method may be iteratively performed.

FIG. 11 shows an intruder response method implemented by the occupant safety system 900 of FIG. 9. Although the following operations are primary directed to the implementations of FIGS. 8-9, the operations are applicable to other embodiments of the present disclosure.

The method may begin at 1100. At 1102, the interior monitoring module 940 may measure room interior ambient temperature and temperatures at multiple zones in the room 800, as well as other sensor data. At 1104, the interior monitoring module 940 may save all measured sensor values into memory 924.

At 1106, the interior monitoring module 940 may calculate temperature gradients versus time and space as described above. At 1110, the interior monitoring module 940 may calculate gradients of gradients, as described above. The interior monitoring module 940 may also calculate distances for (or changes in) temperature and temperature gradients. At 1111, the determined gradient values may be stored in the memory 924.

At 1112, the interior monitoring module 940 may analyze the temperatures, temperature gradients, and gradients of gradients measured and determined at 1102, 1106 and 1110 and corresponding history values thereof. This data may be analyzed based on historical data and/or previously stored and identified temperature and gradient patterns and/or profiles. This may include comparing temperature and/or gradient patterns and profiles of the data collected and calculated above to historical and/or previously stored patterns and profiles of occupants and the interior of the room 800. As an example, a temperature profile of an occupant may be stored in memory and compared with a temperature profile of a current occupant to identify whether the occupant is present, determine whether the occupant is a child or a pet, determine location of the occupant, etc. This analysis may be performed to determine if the occupant is behaving normal for the current day and time of day. The analysis may be done to check temperatures of the occupants and/or to determine if the temperatures are outside certain predetermined ranges and/or are changing at an unusual rate.

The analysis may be performed to determine if the occupant is an occupant not typically in the room 800, such as an intruder, for the current day and time and/or is behaving differently than an occupant normally behaves for that day and time. The behavior may include: the manner in which the occupant enters the room (e.g., through a window or a door), the rate of speed the occupant is moving, erratic movement, etc. The analysis may be performed to determine, for example, the number of occupants in the room and whether this is an unusual number of occupants. The analysis may be performed to determine if an occupant is in the room and normally is not in the room and/or should not be in the room. Artificial intelligence (AI) may be used to distinguish between different patterns and profiles and to learn over time and identify states, behaviors and conditions.

At 1114, the interior monitoring module 940 may determine if first criteria are satisfied including whether some subsets of the temperature, temperature gradient, distances, and/or other parameters are within first predetermined ranges. The ranges for different subsets may not be the same. Temperatures and/or gradient patterns and profiles may also be compared to a first set of patterns and profiles, as similarly described above. If the subsets are within certain ranges and/or there is a match to the first set of patterns and profiles, then operation 1102 is performed, otherwise operation 1116 may be performed. Returning to operation 1102 may occur, for example, when a probability of an issue existing is below a predetermined probability level and/or when no potential issue exists. The probability of an issue existing may be determined based on whether the temperatures and/or gradient patterns and profiles match the first set of patterns and profiles and/or how close the temperature and or gradient patterns and profiles are to the first set of patterns and profiles. Artificial intelligence (AI) may be used to distinguish between different patterns and profiles and to learn over time and identify states and conditions and/or whether the first criteria are satisfied.

At 1116, the interior monitoring module 940 may determine if a second set of predetermined criteria is satisfied. This may include determining if some subsets of the temperature, temperature gradient, distances, and/or other parameters (these subsets may not be the same subsets as in operation 1114) are within second predetermined ranges (again these ranges may not be the same as in operation 1114). The ranges for different subsets may not be the same. Temperatures and/or gradient patterns and profiles may also be compared to a second set of patterns and profiles, as similarly described above. Temperatures and/or gradient patterns and profiles may also be compared to a second set of patterns and profiles, as similarly described above. If the subsets are within certain ranges and/or there is a match to the second set of patterns and profiles, then operation 1118 is performed, otherwise operation 1102 is performed. Operations 1114 and 1116 may be performed to determine whether one or more occupants are present in the room 800, as well as to determine the location of the occupants and whether the occupants are moving. Other aspects of the occupants may also be determined. The interior monitoring module 940 may monitor movement and behavior of the occupants, as well as states of the occupants. Returning to operation 1102 may occur, for example, when a probability of an issue existing is below a predetermined probability level and/or when no potential issue exists. The probability of an issue existing may be determined based on whether the temperatures and/or gradient patterns and profiles match the second set of patterns and profiles and/or how close the temperature and or gradient patterns and profiles are to the second set of patterns and profiles. Artificial intelligence (AI) may be used to distinguish between different patterns and profiles and to learn over time and identify states and conditions and/or whether the second criteria are satisfied.

At 1118, the interior monitoring module 940 may determine whether an intruder is detected. At 1120, the interior monitoring module 940 may perform one or more countermeasures. For example, at 1120A, the interior monitoring module 940 may turn on the light for the camera 904 and take pictures and/or video with the camera. At 1120B, the interior monitoring module 940 may send the pictures or videos and warning signals to predefined receivers of one or more of the devices 154, 156, 158 via the transceiver 932, such as to a police department, a fire department, a home owner, a friend, a caregiver, a monitoring station, etc. The warning signals sent to the devices 154, 156, 158 may include information indicating: states of the occupants; states of the devices of the space; location of the space; and/or the conditions within the space. At 1120C, the interior monitoring module 940 may also take other actions, such as to turn on warning lights, speaker, unlock or lock windows and/or doors, send an alarm signal to one or more central monitoring devices, adjust operation of the HVAC system 950, etc.

At 1124, the interior monitoring module 940 may determine if a confirmation is received from one of the devices 154, 156, 158. If a confirmation is not received, then operation 1126 is performed, otherwise operation 1128 is performed. At 1126, after a predefined time interval, if the system 900 does not receive a confirmation from one of predefined devices 154, 156, 158, then operation 1120 is performed.

At 1128, the interior monitoring module 940 determines whether a command is received from one of the devices 154, 156, 158. If a command is received, the operation 1120 is performed, otherwise operation 1130 is performed. At 1130, the interior monitoring module 940 may wait another predetermined time interval and then proceed to operation 1102. This method may be iteratively performed.

The above-described operations of FIGS. 4 and 10-11 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

Systems and methods are provided to detect an occupant (s) in a space and to monitor occupant's movement and to detect occupant's fall or other abnormity. Exemplary systems and methods may include operations and/or instructions comprising measuring temperature for multiple zones inside a space; calculating temperature gradients versus both time and space; further calculating distances for temperature and temperature gradients; analyzing those parameters and determining an occupant(s) and occupant's fall detected; and send warning signals to predefined receivers and taking predefined actions.

A system and method for monitoring an occupant's movement including at least one temperature monitor unit, the temperature monitor unit having a temperature measurement unit that measures temperature at multiple zones. The temperature monitor unit configured to define the whole interior of a space into multiple zones. The system may also include a camera system to take pictures or videos to reduce false alarms when the system detects an occupant's fall or other abnormity. The system is further configured to take actions when it detects occupant's fall or other abnormity. The system configured to send warning signal to predefined receivers and taking other actions.

Multiple temperature monitoring modules and sensors may be place in different locations of a room, such as in and/or on ceilings, walls, floors, and/or other locations. Multiple temperature monitoring modules and sensors may be placed in different rooms, such as a bedroom, a kitchen, a bathroom and work together to monitor occupants. The temperature monitoring modules and sensors may be moveable and mounted on devices that are controlled via actuators and control modules to measure multiple points and/or track an occupant's movement.

The above-described occupant security systems may be maintained in an active (or ON) state. This is unlike some traditional security systems that must be activated or deactivated depending on whether, for example, a resident of a home is in the home. The occupant security systems are able to distinguish between different occupants based on historical data and detect when a new temperature and/or gradient pattern and/or profile is present and/or an unusual occupant behavior is detected. The occupant security systems do not require a user to wear an alert button and do not continuously acquire images and/or video of an area of a building, which can be a privacy issue. The occupant security systems acquire images and/or video when an issue is detected as a countermeasure or as required by authorized users.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules. The term memory refers to a memory circuit.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle occupant safety system comprising:
a temperature monitoring module comprising at least one temperature sensor, wherein the temperature monitoring module is configured to detect temperatures in a plurality of zones within an interior of a vehicle;
an ambient temperature sensor configured to detect an ambient temperature within the interior of the vehicle; and
an interior monitoring module configured to
based on the detected temperatures of the plurality of zones, determine for the plurality of zones at least one of a temperature gradient over time or a temperature gradient over space,
determine if the ambient temperature is outside a predetermined range, and
in response to the ambient temperature being outside the predetermined range and based on the at least one of a temperature gradient over time or a temperature gradient over space, detecting an occupant in the vehicle and performing a countermeasure to prevent an injury to the occupant.

2. The vehicle occupant safety system of claim 1, wherein the interior monitoring module is configured to:
determine whether at least one of a propulsion system, an engine, or a motor is deactivated; and
perform the countermeasure in response to the at least one of the propulsion system, the engine, or the motor being deactivated.

3. The vehicle occupant safety system of claim 1, wherein the interior monitoring module is configured to:
determine at least one of whether an occupant is in a driver seat of the vehicle or a driver door of the vehicle is transitioned from a closed state to an open state or from an open state to a closed state; and
perform the countermeasure in response to at least one of no occupant being in the driver seat or the driver door being opened or closed.

4. The vehicle occupant safety system of claim 1, wherein the interior monitoring module is configured to:
based on the detected temperatures, determine for each of at least some of the plurality of zones a temperature gradient over time; and
in response to the ambient temperature being outside the predetermined range and based on the temperature gradients over time of the at least some of the plurality of zones, detecting the occupant in the vehicle and performing the countermeasure to prevent an injury to the occupant.

5. The vehicle occupant safety system of claim 1, wherein the interior monitoring module is configured to:
based on the detected temperatures of the plurality of zones, determine for at least some of the plurality of zones the temperature gradient over space; and
in response to the ambient temperature being outside the predetermined range and based on the temperature gradient over space, detecting the occupant in the vehicle and performing the countermeasure to prevent an injury to the occupant.

6. The vehicle occupant safety system of claim 1, wherein the interior monitoring module is configured to:
- based on the detected temperatures of the plurality of zones, determine for the plurality of zones the temperature gradient over time and the temperature gradient over space; and
- in response to the ambient temperature being outside the predetermined range and based on the temperature gradient over time and the temperature gradient over space, detecting the occupant in the vehicle and performing the countermeasure to prevent an injury to the occupant.

7. The vehicle occupant safety system of claim 1, wherein the interior monitoring module is configured to:
- based on the detected temperatures of the plurality of zones, determine for the plurality of zones at least one of a gradient of the temperature gradient over time or a gradient of the temperature gradient over space; and
- in response to the ambient temperature being outside the predetermined range and based on the at least one of the gradient of the temperature gradient over time or the gradient of the temperature gradient over space, detecting the occupant in the vehicle and performing the countermeasure to prevent an injury to the occupant.

8. The vehicle occupant safety system of claim 1, wherein the countermeasure includes:
- at least one of capturing an image or recording a video of at least a portion of the interior of the vehicle; and
- transmitting at least one of the image or the video to a personal related network device or a central monitoring device.

9. The vehicle occupant safety system of claim 1, wherein the countermeasure includes at least one of taking a measurement, doing a calculation, opening a window, opening a door, opening a roof panel, or controlling operation of a heating, ventilation, and air conditioning system.

10. The vehicle occupant safety system of claim 1, wherein the interior monitoring module is configured to:
- in response to the ambient temperature being outside the predetermined range and based on the at least one of the temperature gradient over time or the temperature gradient over space, transmit a signal to at least one of a personal related network device or a central monitoring device;
- based on the signal transmitted to the at least one of the personal related network device or the central monitoring device, receive a response signal; and
- based on the response signal, perform the countermeasure.

11. The vehicle occupant safety system of claim 10, wherein the signal is transmitted to the at least one of the personal related network device or the central monitoring device includes condition information describing a state of the interior of the vehicle including a state of the occupant in the interior.

12. The vehicle occupant safety system of claim 1, wherein:
- the at least one temperature sensor comprises a thermopile array sensor; and
- the thermopile array sensor is configured to divide the interior of the vehicle into the plurality of zones and measure the temperatures in the plurality of zones.

13. The vehicle occupant safety system of claim 1, further comprising an actuator, wherein interior monitoring module is configured to move the at least one temperature sensor to scan the interior of the vehicle to measure temperatures in the plurality of zones.

14. A method of operating a vehicle occupant safety system, the method comprising:
- detecting temperatures in a plurality of zones within an interior of a vehicle;
- detecting an ambient temperature within the interior of the vehicle;
- based on the detected temperatures of the plurality of zones, determining for the plurality of zones at least one of a temperature gradient over time or a temperature gradient over space;
- determining if the ambient temperature is outside a predetermined range; and
- in response to the ambient temperature being outside the predetermined range and based on the at least one of a temperature gradient over time or a temperature gradient over space, detecting an occupant in the vehicle and performing a countermeasure to prevent an injury to the occupant.

15. The method of claim 14, further comprising:
- determining whether at least one of a propulsion system, an engine, or a motor is deactivated; and
- performing the countermeasure in response to the at least one of the propulsion system, the engine, or the motor being deactivated.

16. The method of claim 14, further comprising:
- determining at least one of whether an occupant is in a driver seat of the vehicle or a driver door of the vehicle is transitioned from a closed state to an open state or from an open state to a closed state; and
- performing the countermeasure in response to at least one of no occupant being in the driver seat or the driver door being opened or closed.

17. The method of claim 14, further comprising:
- based on the detected temperatures of the plurality of zones, determining for each of at least some of the plurality of zones a temperature gradient over time; and
- in response to the ambient temperature being outside the predetermined range and based on the temperature gradients over time of the at least some of the plurality of zones, detecting the occupant in the vehicle and performing the countermeasure to prevent an injury to the occupant.

18. The method of claim 14, further comprising:
- based on the detected temperatures of the plurality of zones, determining for at least some of the plurality of zones the temperature gradient over space; and
- in response to the ambient temperature being outside the predetermined range and based on the temperature gradient over space, detecting the occupant in the vehicle and performing the countermeasure to prevent an injury to the occupant.

19. The method of claim 14, further comprising:
- based on the detected temperatures of the plurality of zones, determining for the plurality of zones the temperature gradient over time and the temperature gradient over space; and
- in response to the ambient temperature being outside the predetermined range and based on the temperature gradient over time and the temperature gradient over space, detecting the occupant in the vehicle and performing the countermeasure to prevent an injury to the occupant.

20. The method of claim 14, further comprising:
- based on the detected temperatures of the plurality of zones, determining for the plurality of zones at least one of a gradient of the temperature gradient over time or a gradient of the temperature gradient over space; and in response to the ambient temperature being outside the predetermined range and based on the at least one of the gradient of the temperature gradient over time or the gradient of the temperature gradient over space, detecting the occupant in the vehicle and performing the countermeasure to prevent an injury to the occupant.

21. The method of claim 14, wherein the countermeasure includes:

at least one of capturing an image or recording a video of at least a portion of the interior of the vehicle; and transmitting at least one of the image or the video to a personal related network device or a central monitoring device.

22. The method of claim 14, wherein the countermeasure includes at least one of taking a measurement, doing a calculation, opening a window, opening a door, opening a roof panel, or controlling operation of a heating, ventilation, and air conditioning system.

23. The method claim 14, further comprising:

in response to the ambient temperature being outside the predetermined range and based on the at least one of the temperature gradient over time or the temperature gradient over space, transmitting a signal to at least one of a personal related network device or a central monitoring device;

based on the signal transmitted to the at least one of the personal related network device or the central monitoring device, receiving a response signal; and based on the response signal, performing the countermeasure.

24. The method of claim 23, wherein the signal is transmitted to the at least one of the personal related network device or the central monitoring device includes condition information describing a state of the interior of the vehicle including a state of the occupant in the interior.

25. The method of claim 14, wherein:

the temperatures of the plurality of zones are detected via a thermopile array sensor; and the thermopile array sensor is configured to divide the interior of the vehicle into the plurality of zones and measure the temperatures in the plurality of zones.

26. The method of claim 14, further comprising moving at least one temperature sensor to scan the interior of the vehicle to measure temperatures in the plurality of zones.

* * * * *